United States Patent
Anderson et al.

(10) Patent No.: US 9,652,723 B2
(45) Date of Patent: May 16, 2017

(54) ELECTRICAL TRANSFORMER FAILURE PREDICTION

(71) Applicant: SAS Institute Inc., Cary, NC (US)

(72) Inventors: Thomas Dale Anderson, Peoria, AZ (US); James Edward Duarte, Clermont, FL (US); Milad Falahi, Sacramento, CA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/173,927

(22) Filed: Jun. 6, 2016

(65) Prior Publication Data

US 2016/0358106 A1 Dec. 8, 2016

Related U.S. Application Data

(60) Provisional application No. 62/171,521, filed on Jun. 5, 2015, provisional application No. 62/337,495, filed on May 17, 2016.

(51) Int. Cl.
*G06F 15/18* (2006.01)
*G06N 99/00* (2010.01)
*G06N 7/00* (2006.01)

(52) U.S. Cl.
CPC .......... *G06N 99/005* (2013.01); *G06N 7/005* (2013.01)

(58) Field of Classification Search
None
See application file for complete search history.

(56) References Cited

U.S. PATENT DOCUMENTS

| 8,024,077 | B2 | 9/2011 | Torre et al. |
| 8,121,741 | B2 | 2/2012 | Taft et al. |
| 8,319,658 | B2 | 11/2012 | Conant et al. |
| 8,896,461 | B2 | 11/2014 | Angelis et al. |
| 8,959,006 | B2 | 2/2015 | Nasle |
| 9,031,824 | B2 | 5/2015 | Nasle |
| 9,048,664 | B2 | 6/2015 | Arya et al. |
| 9,112,710 | B2 | 8/2015 | Taft et al. |

(Continued)

OTHER PUBLICATIONS

Soysal et al. "Machine learning algorithms for accurate flow-based network traffic classification: Evaluation and comparison", Performance Evaluation 67 (2010), pp. 451-467.*
Feature selection, scikit-learn, May 2015, pp. 6, https://web.archive.org/web/20150524171143/http://scikit-learn.org/stable/modules/feature_selection.html.*
Petersen "Risk Equals Probability Times Consequences", 2014, pp. 8, http://tdworld.com/substations/risk-equals-probability-times-consequences.*

(Continued)

Primary Examiner — Li-Wu Chang
(74) Attorney, Agent, or Firm — Bell & Manning, LLC

(57) ABSTRACT

A computing device predicts a probability of a transformer failure. An analysis type indicator defined by a user is received. A worth value for each of a plurality of variables is computed. Highest worth variables from the plurality of variables are selected based on the computed worth values. A number of variables of the highest worth variables is limited to a predetermined number based on the received analysis type indicator. A first model and a second model are also selected based on the received analysis type indicator. Historical electrical system data is partitioned into a training dataset and a validation dataset that are used to train and validate, respectively, the first model and the second model. A probability of failure model is selected as the first model or the second model based on a comparison between a fit of each model.

30 Claims, 20 Drawing Sheets

(56) References Cited

U.S. PATENT DOCUMENTS

| | | |
|---|---|---|
| 2005/0091004 A1* | 4/2005 | Parlos ............... G05B 19/4065 |
| | | 702/185 |
| 2008/0049013 A1 | 2/2008 | Nasle |
| 2008/0262820 A1 | 10/2008 | Nasle |
| 2012/0326883 A1 | 12/2012 | Angelis et al. |
| 2013/0024167 A1 | 1/2013 | Blair et al. |
| 2013/0253718 A1 | 9/2013 | Meagher et al. |
| 2014/0214218 A1 | 7/2014 | Eldridge et al. |
| 2014/0222375 A1 | 8/2014 | Das et al. |
| 2014/0277786 A1 | 9/2014 | Forbes, Jr. |
| 2015/0057821 A1 | 2/2015 | Nasle |
| 2015/0112907 A1 | 4/2015 | Nasle et al. |
| 2015/0153757 A1 | 6/2015 | Meagher |
| 2015/0180538 A1 | 6/2015 | Smith et al. |
| 2015/0249585 A1* | 9/2015 | Shomura ................ H04L 67/02 |
| | | 709/224 |

OTHER PUBLICATIONS

Anderson et al., An Approach to Transformer Load Management Analytics, AEIC 2012 Load Research Workshop, Mar. 18, 2012.
Li et al., Aging Assessment of Power Transformer Using Multi-parameters, International Journal on Electrical Engineering and Informatics—vol. 5, No. 1, Mar. 2013, pp. 34-44.
SAS Institute Inc 2013. Getting Started with SAS® Enterprise MinerTM 13.1. Cary, NC: SAS Institute Inc., pp. 1-70.
SAS Institute Inc. 2015. Getting Started with SAS® Enterprise MinerTM 14.1. Cary, NC: SAS Institute Inc., Jul. 2015, pp. 1-70.
SAS Institute Inc. 2015. SAS® Enterprise MinerTM 14.1 Extension Nodes: Developer's Guide. Cary, NC: SAS Institute Inc., Jul. 2015, pp. 1-214.

* cited by examiner

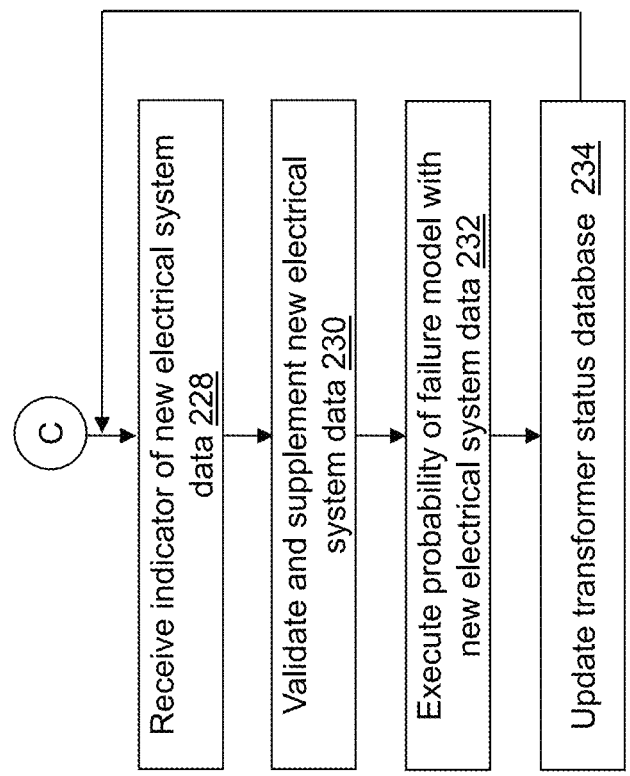

| Circuitsection | Transformer | Failure Probability | KVA | DTMType | CriticalLoadIndicator |
|---|---|---|---|---|---|
| 12498 | 5053809944 | 0% | 50 | U | Yes |
| 10000 | 4955952233 | 0% | 75 | O | Yes |
|  | 5855495074 | 0% |  | U |  |
|  | 5053497495 | 0% |  | U |  |
| 12247 | 4954602529 | 0% | 75 | U | Yes |
|  | 4954499543 | 0% |  | U |  |
|  | 5153496096 | 0% |  | U |  |
|  | 5855495091 | 0% |  | O |  |
| 11712 | 4856624193 | 0% | 75 | O | Yes |
|  | 5155490397 | 0% |  | O |  |
| 31850 | 5859723439 | 0% | 50 | U | Yes |

FIG. 7

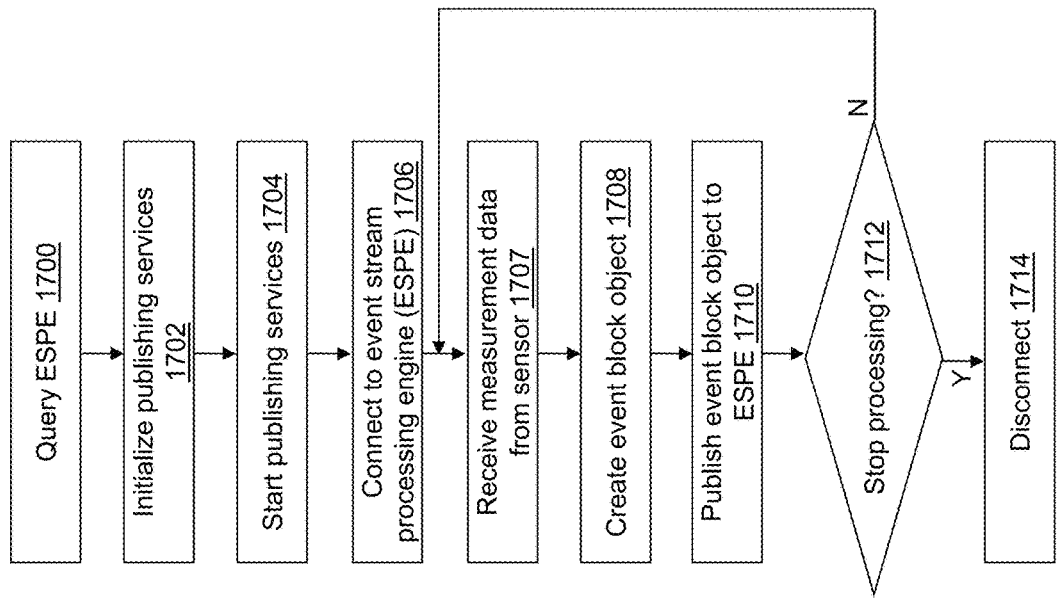

ELECTRICAL TRANSFORMER FAILURE PREDICTION

CROSS-REFERENCE TO RELATED APPLICATIONS

The present application claims the benefit of 35 U.S.C. §119(e) to U.S. Provisional Patent Application No. 62/171,521 filed on Jun. 5, 2015, and to U.S. Provisional Patent Application No. 62/337,495 filed on May 17, 2016, the entire contents of which are hereby incorporated by reference.

BACKGROUND

Transformers are an essential component of all electric grids in the United States with over 40 million distribution transformers in use across the United States. Transformers convert the high voltage running in the distribution lines to lower voltages safer for lines distributing electricity into homes and businesses. New transformers have an initial efficiency above 98%, though this decreases with extended use. Many of the transformers used in the electric grid of the United States were commissioned in the 1960's and 1970's. Because of this, electric power companies are increasingly concerned about the status of the transformers and how long the transformers will continue to perform before a failure or overload occurs.

One way to determine the longevity of a transformer is through frequent periodic site visits by maintenance personnel. This is costly and difficult to implement due to the large number of transformers and their distributed geographic locations. Remote monitoring is possible, but the additional installation of monitoring equipment is cost prohibitive on all but the most critical transformers. As components of the electric grid age, there will be an ever increasing demand on the maintenance teams responsible for the reliability of the system. By targeting specific components, such as transformers that are likely to fail, the maintenance teams may replace the failing component before it drastically loses efficiency or experiences a catastrophic failure. By targeting specific transformers, the efficiency gained by replacing a failing unit, or repairing an unhealthy transformer, even one day sooner, can save emissions produced burning the fossil fuel used to generate the electricity.

SUMMARY

In another example embodiment, a non-transitory computer-readable medium is provided having stored thereon computer-readable instructions that, when executed by a computing device, cause the computing device to predict a probability of an electrical transformer failure. Historical electrical system data that includes a plurality of observations with a plurality of data points defined for each observation is received. Each data point of the plurality of data points is associated with a variable to define a plurality of variables. The received historical electrical system data is partitioned into a training dataset and a validation dataset. The validation dataset is different from the training dataset. An analysis type indicator defined by a user is received. A worth value for each of the plurality of variables is computed. Highest worth variables from the plurality of variables are selected based on the computed worth values. A number of variables of the highest worth variables is limited to a predetermined number based on the received analysis type indicator. A first model is selected based on the received analysis type indicator. The selected first model is trained using values from the training dataset of the selected highest worth variables to predict a probability of failure of a plurality of electrical transformers. The trained first model is validated using the validation dataset to statistically assess a fit by the trained first model to the historical electrical system data. A second model is selected based on the received analysis type indicator. The selected second model is trained using values from the training dataset of the selected highest worth variables to predict the probability of failure of the plurality of electrical transformers. The trained second model is validated using the validation dataset to statistically assess the fit by the trained second model to the historical electrical system data. The fit by the trained first model is compared to the fit by the trained second model. A probability of failure model is selected as the validated first model or the validated second model based on the comparison. Electrical system data for a transformer is received. The selected probability of failure model is executed with the received electrical system data to compute a probability of failure of the transformer. A failure probability for the transformer is updated based on the computed probability of failure.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to predict a probability of an electrical transformer failure.

In an example embodiment, a method of predicting a probability of an electrical transformer failure is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, 2C, and 2D depict a flow diagram illustrating examples of operations performed by the failure prediction device of FIG. 1 in accordance with an illustrative embodiment.

FIG. 7 shows a failure probability table for an electrical system in accordance with an illustrative embodiment.

FIG. 17 depicts a flow diagram illustrating examples of operations performed by the electrical data publishing system of FIG. 11 in accordance with an illustrative embodiment.

DETAILED DESCRIPTION

Figure 1:
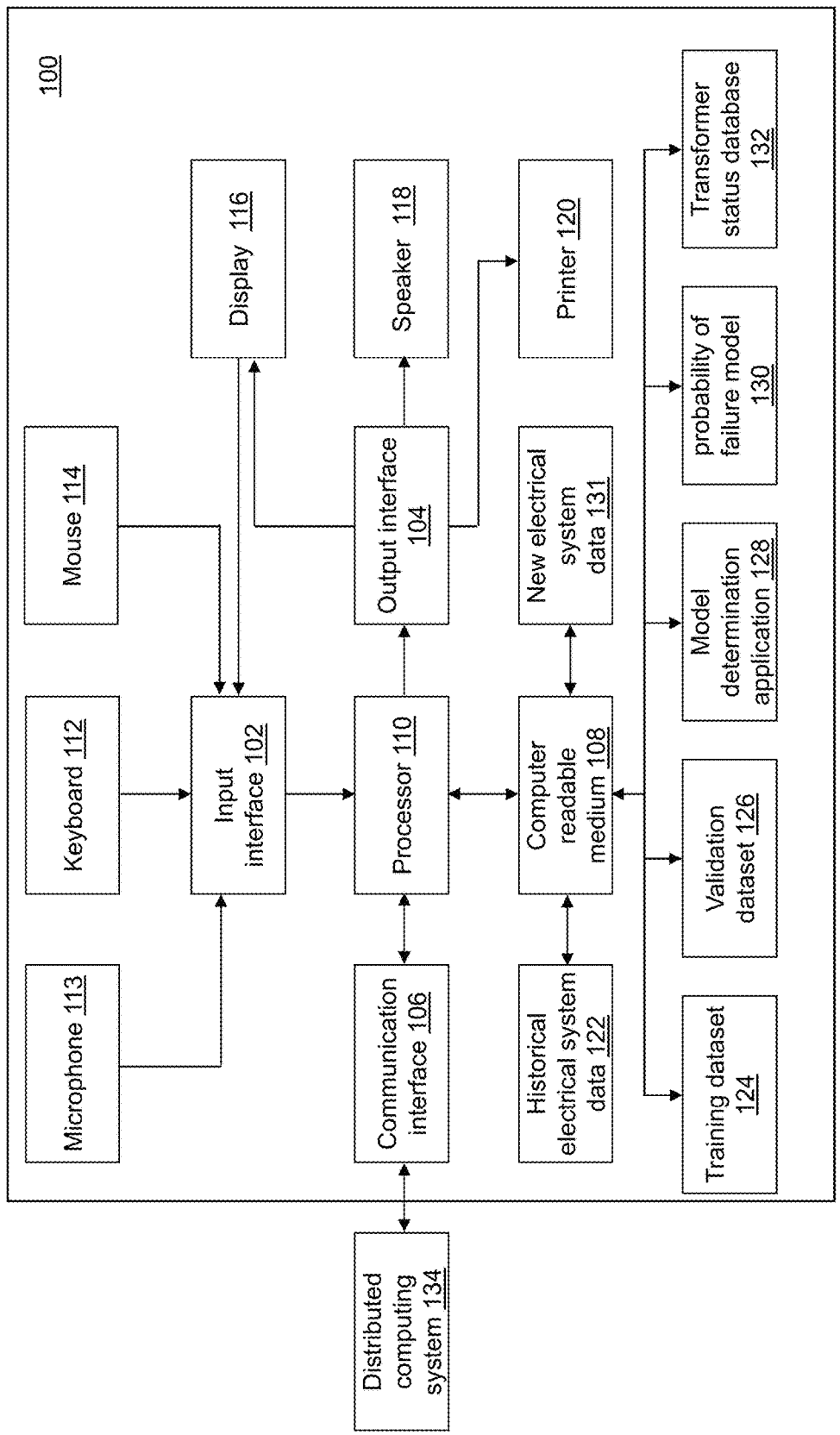
FIG. 1 depicts a block diagram of a failure prediction device in accordance with an illustrative embodiment.

Referring to FIG. 1, a block diagram of a failure prediction device 100 is shown in accordance with an illustrative embodiment. Failure prediction device 100 may include an input interface 102, an output interface 104, a communication interface 106, a non-transitory computer-readable medium 108, a processor 110, historical electrical system data 122, a training dataset 124, a validation dataset 126, a model determination application 128, a probability of failure model 130, new electrical system data 131, and a transformer status database 132. Fewer, different, and/or additional components may be incorporated into failure prediction device 100.

Input interface 102 provides an interface for receiving information from the user or another device for entry into failure prediction device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into failure prediction device 100 or to make selections presented in a user interface displayed on the display. The same interface may support both input interface 102 and output interface 104. For example, display 116 comprising a touch screen provides user input and presents output to the user. Failure prediction device 100 may have one or more input interfaces that use the same or a different input interface technology. The input interface technology further may be accessible by failure prediction device 100 through communication interface 106.

Output interface 104 provides an interface for outputting information for review by a user of failure prediction device 100 and/or for use by another application or device. For example, output interface 104 may interface with various output technologies including, but not limited to, display 116, a speaker 118, a printer 120, etc. Failure prediction device 100 may have one or more output interfaces that use the same or a different output interface technology. The output interface technology further may be accessible by failure prediction device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Failure prediction device 100 may have one or more communication interfaces that use the same or a different communication interface technology. For example, failure prediction device 100 may support communication using an Ethernet port, a Bluetooth antenna, a telephone jack, a USB port, etc. Data and messages may be transferred between failure prediction device 100 and a distributed computing system 134 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Failure prediction device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Failure prediction device 100 also may have one or more drives that support the loading of a memory media such as a CD, DVD, an external hard drive, etc. One or more external hard drives further may be connected to failure prediction device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Failure prediction device 100 may include a plurality of processors that use the same or a different processing technology.

Model determination application 128 performs operations associated with defining probability of failure model 130 from data stored in training dataset 124 and validation dataset 126 and/or with creating/updating transformer status database 132 from new electrical system data 131 using the defined probability of failure model 130. The defined probability of failure model 130 may be used to determine a probability of failure of an electrical transformer as well as provide alert/messaging related to the determined probabilities. Some or all of the operations described herein may be embodied in model determination application 128. The operations may be implemented using hardware, firmware, software, or any combination of these methods.

Referring to the example embodiment of FIG. 1, model determination application 128 is implemented in software (comprised of computer-readable and/or computer-executable instructions) stored in computer-readable medium 108 and accessible by processor 110 for execution of the instructions that embody the operations of model determination application 128. Model determination application 128 may be written using one or more programming languages, assembly languages, scripting languages, etc. Model determination application 128 may be integrated with other analytic tools. For example, model determination application 128 may be part of SAS® Enterprise Miner™ developed and provided by SAS Institute Inc. of Cary, N.C., USA that may be used to create highly accurate predictive and descriptive models based on analysis of vast amounts of data. Model determination application 128 further may be part of SAS® Enterprise Guide, SAS® Visual Analytics, SAS® LASR™ Analytic Server, and/or SAS® Access Engine(s) also developed and provided by SAS Institute Inc. of Cary, N.C., USA.

For example, SAS® Visual Analytics allows users to summarize data, join data, enhance the predictive power of their data, and visualize data. Users can prepare data for exploration and mining quickly and easily. The highly visual, drag-and-drop data interface of SAS Visual Analytics Explorer, combined with the speed of the SAS® LASR™ Analytic Server, accelerates analytic computations to derive value from massive amounts of data. SAS Visual Analytics Designer enables users to quickly create reports or dashboards, which can be viewed on a mobile device or on the web.

Model determination application 128 may be integrated with other system processing tools to automatically process data, to determine probabilities of failure or other status data associated with a plurality of electrical transformers, and/or to provide a warning or alert associated with the failure prediction using input interface 102, output interface 104, and/or communication interface 106 so that appropriate action can be initiated in response to the failure prediction.

Model determination application 128 may be implemented as a Web application. For example, model determination application 128 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Historical electrical system data 122 may include, for example, a plurality of rows and a plurality of columns. The plurality of rows may be referred to as observations or records, and the columns may be referred to as variables that are associated with an observation. The variables may define multiple dimensions. Values associated with two or more variables for the same observation may be referred to as a data point. For example, each data point of a plurality of data points is defined in a first dimension using a first variable, in a second dimension using a second variable, etc. The first dimension may be referenced as an x-dimension, the second dimension may be referenced as a y-dimension, the third dimension may be referenced as a z-dimension, etc. When a goal is to render a graph with the data points, the x-dimension may define an x-coordinate, the y-dimension may define a y-coordinate, and the z-dimension may define a z-coordinate. Each data point represents a group of values selected from all or a subset of the columns of historical electrical system data 122 for a single observation. Historical electrical system data 122 may be transposed. Historical electrical system data 122 may include supervised data that indicates whether or not a failure occurred.

Historical electrical system data 122 may be stored on computer-readable medium 108 or on one or more computer-readable media of distributed computing system 134 and accessed by failure prediction device 100 using communication interface 106, input interface 102, and/or output interface 104. Data stored in historical electrical system data 122 may include sensor measurements or signal values captured by a sensor and/or generated from the sensor measurements or signal values. The data stored in historical electrical system data 122 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in historical electrical system data 122 may be captured at different time points, periodically, intermittently, when an event occurs, etc. One or more columns may include a time value.

Data stored in historical electrical system data 122 may be generated as part of the Internet of Things (IoT), where things (e.g., machines, devices, phones, sensors) can be connected to networks and the data from these things collected and processed within the things and/or external to the things before being stored in historical electrical system data 122. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine (ESP), which may reside in the cloud or in an edge device before being stored in historical electrical system data 122.

Historical electrical system data 122 may be stored in various compressed formats such as a coordinate format, a compressed sparse column format, a compressed sparse row format, etc. Historical electrical system data 122 further may be stored using various structures as known to those skilled in the art including a file system, a relational database, a system of tables, a structured query language database, etc.

on failure prediction device 100 or on distributed computing system 134. Failure prediction device 100 and/or distributed computing system 134 may coordinate access to historical electrical system data 122 that is distributed across a plurality of computing devices. For example, historical electrical system data 122 may be stored in a cube distributed across a grid of computers as understood by a person of skill in the art. As another example, historical electrical system data 122 may be stored in a multi-node Hadoop® cluster. For instance, Apache™ Hadoop® is an open-source software framework for distributed computing supported by the Apache Software Foundation. As another example, historical electrical system data 122 may be stored in a cloud of computers and accessed using cloud computing technologies, as understood by a person of skill in the art. The SAS® LASR™ Analytic Server may be used as an analytic platform to enable multiple users to concurrently access data stored in historical electrical system data 122. Some systems may use SAS In-Memory Statistics for Hadoop® developed and provided by SAS Institute Inc. of Cary, N.C. to read big data once and analyze it several times by persisting it in-memory for the entire session. Some systems may be of other types and configurations.

Training dataset 124 may be generated from historical electrical system data 122. Training dataset 124 may be stored and accessed using the same or different mechanisms as those described with reference to historical electrical system data 122.

Validation dataset 126 may be generated from historical electrical system data 122. Validation dataset 126 may be stored and accessed using the same or different mechanisms as those described with reference to historical electrical system data 122.

New electrical system data 131 may be received from electric meters and/or electrical transformers deployed across a geographic region. New electrical system data 131 may be stored and accessed using the same or different mechanisms as those described with reference to historical electrical system data 122. Historical electrical system data 122 may be updated with new electrical system data 131 either automatically, for example, after expiration of a timer, or manually, for example, after a failure has occurred. Data stored in new electrical system data 131 may be generated as part of the IoT before being stored in new electrical system data 131. Some data may be processed with an ESP, which may reside in the cloud or in an edge device before being stored in new electrical system data 131.

Transformer status database 132 may be generated from execution of probability of failure model 130 with new electrical system data 131. Transformer status database 132 may be stored and accessed using the same or different mechanisms as those described with reference to historical electrical system data 122.

Referring to FIGS. 2A, 2B, 2C, and 2D, example operations associated with model determination application 128 are described. For example, model determination application 128 may be used to define probability of failure model 130 from training dataset 124 and validation dataset 126 and to execute probability of failure model 130 with new electrical system data 131 to update transformer status database 132. Additional, fewer, or different operations may be performed depending on the embodiment. The order of presentation of the operations of FIGS. 2A, 2B, 2C, and 2D is not intended to be limiting. Although some of the operational flows are presented in sequence, the various operations may be performed in various repetitions, concurrently (in parallel, for example, using threads and/or distributed computing system 134), and/or in other orders than those that are illustrated. For example, a user may execute model determination application 128, which causes presentation of a first user interface window, which may include a plurality of menus and selectors such as drop down menus, buttons, text boxes, hyperlinks, etc. associated with model determination application 128 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by model determination application 128.

Figure 2A:
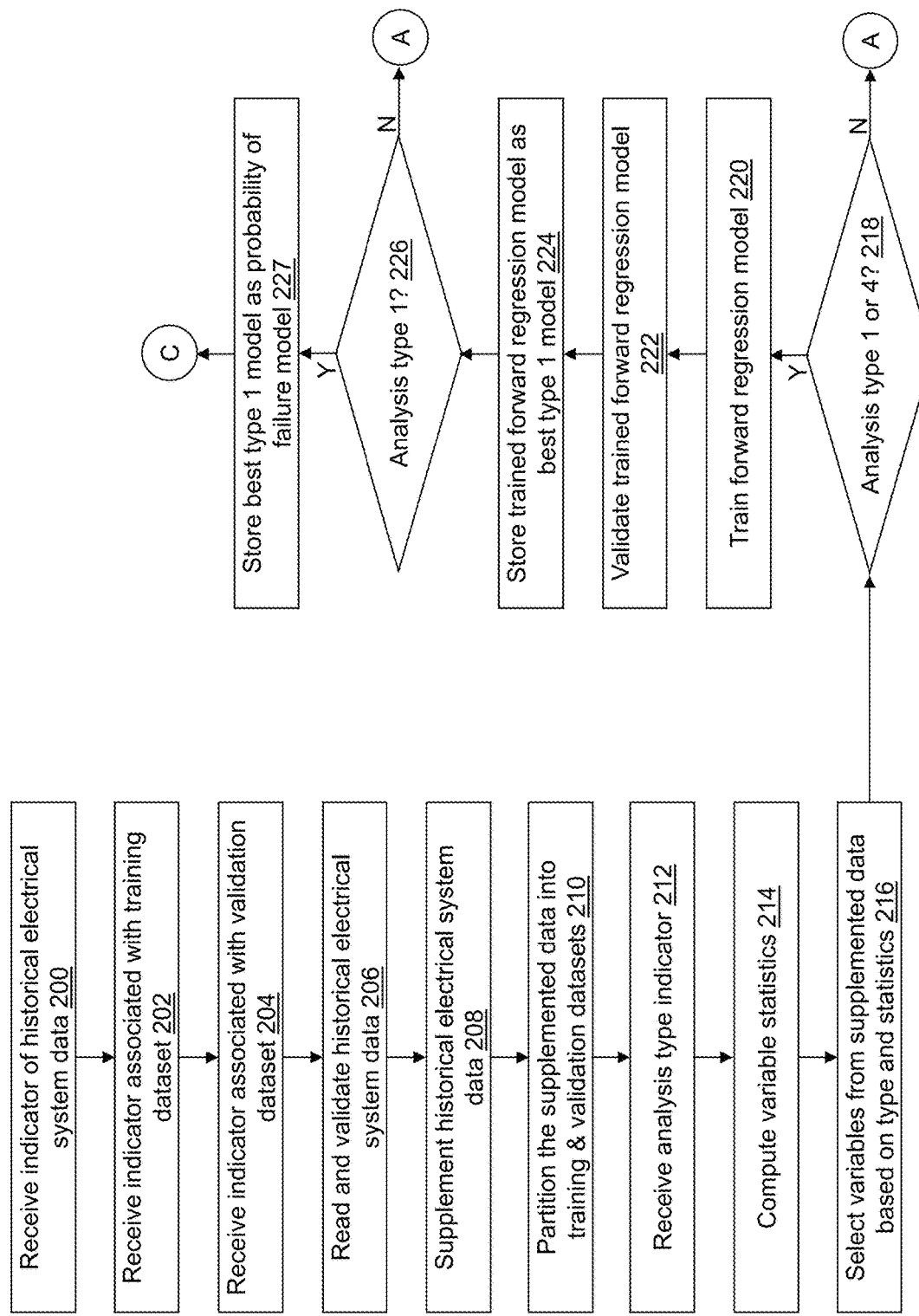

Referring to FIG. 2A, in an operation 200, a first indicator is received that indicates historical electrical system data 122. For example, the first indicator indicates a location and a name of historical electrical system data 122. As an example, the first indicator may be received by model determination application 128 after selection from a user interface window or after entry by a user into a user interface window. In an alternative embodiment, historical electrical system data 122 may not be selectable. For example, a most recently created dataset may be used automatically.

Historical electrical system data 122 may be provided by an electric utility company for electric meters and/or transformers. Historical electrical system data 122 may include usage data from the electric meters and/or transformers as well as data associated with the electric meters and/or transformers such as customer information, location information, weather information, meter attribute information, meter maintenance information, meter event information, meter interval usage, transformer attribute information, etc. Different utilities may provide different types and combinations of data.

Customer information may include a customer number, a meter number, a meter route number, a meter cycle number, a meter install date, a meter status code, a meter location indicator, a cutoff code, a status code, service dates, a service start date, a service end date, an associated transformer identifier (ID), a critical care indicator, an address, a customer age, a time at the residence, a duration as a customer, a customer sex, a customer marital status, a customer number of residents, etc. The meter location indicator may indicate whether or not the meter is located above the ground, underground, or on the ground.

Location information may include a customer ID, a meter number, a geographic information system (GIS) latitude, a GIS longitude, a low side configuration, a low side voltage, a rated kilovolt-amperes (kVA) value, a high side configuration, a transformer installation date, a nominal voltage, a phase designation, a transformer work order, a circuit section, a line fuse code indicating a size/type of fuse regulating amperes on the transformer, an installed status indicating on or off, a critical load indicator, a region indicator, a dwelling type, a circuit location ID, etc.

Weather information may include a minimum temperature, a maximum temperature, a mean temperature, a current temperature, a mean dewpoint, etc. Meter attribute information may include a meter serial number, a meter name, a meter type, a delay tolerant mobile sensor networks ID, a transformer identifier, a minimum voltage rating, a maximum voltage rating, a rated kVA value, a total kVA rating value, a transformer configuration indicator, etc. For illustration, the transformer configuration indicator may indicate that the transformer is configured as a phase locked loop piezoelectric transformer (PLL), a single phase transformer (SNG), a delta wye transformer (WYE), a close delta transformer (CDT), an open delta transformer (ODT), etc.

Meter maintenance information may include a service type of a most recent service/maintenance performed on the meter, one or more service dates, an install date, an out date on which the meter was last taken offline, one or more critical care flags that indicate that service cannot be interrupted (usually indicates usage for medical/life support), work order information describing maintenance or service performed on the meter (i.e., may be an order number referencing a work order database), etc.

Meter interval usage may include time and date kilowatt-hour (kWh) usage values, time of use flags, peak demand times, etc. Meter interval usage information may include a channel ID, a time period type (i.e. days), a start time consumption, an end time consumption, a TOU Bins, a kWh value, a validation status, a last update time, a usage value, a number of intervals, a number of estimated intervals, a demand peak value, a demand peak time, an estimated usage, etc.

Transformer attribute information may include an age, a type, a size, a configuration, an in-service date, etc.

Meter event information may include a detection of an event that occurs on a meter such as a time change event, a power outage event, a phase error event, a reverse rotation event, a tamper event, a notification event, an unknown event, an out of range event, etc. Meter event information may include a customer ID, a meter number, an event code, a date and time value, a reported date and time value, an event description, an event group, etc. Event times may be measured at second or even sub-second frequency. Events from a meter signal the operational status of the meter.

Event information is captured when an event occurs and may include a meter identifier (ID) (i.e., serial number, name, meter number, address, etc.) recording the event, the date and time of the event, an event type, an event sub-type, etc. Example event types include a time change event type, a power-off event type, a power outage event type, a phase error event type, a reverse rotation event type, a tamper event type, a notification event type, an unknown event type, out of range event type, etc. These events can signify unexpected events (outages) from expected service events (on/off indicators). For illustration, Table 1 includes illustrative event types and an associated data source (Source) and event sub-type (Type).

TABLE I

| Event Type | Event |
|---|---|
| Configuration Change | Source: History; Type: Configuration; Meter Registration |
| Demand Reset | Source:; Type: DemandReset; |
| Demand Reset | Source: History; Type: BillingEvent; Demand Reset Occurred |
| Diagnostics | Source:; Type: FatalError; |
| HAN Status Change | Source: History; Type: HanDeviceEvent; HAN Device Status Change |
| Load Voltage Present | Source:; Type: LoadVoltagePresent; |
| Load Voltage Present | Source: History; Type: StatusEvent; Load Voltage Present during Reconnect |
| Measurement Error | Source:; Type: LowLossPotential; |
| Network Time Change | Source: History; Type: Configuration; Time Changed (new time) |
| Notification | Source: History; Type: Communication; C12.22 Deregistration Attempt |
| Notification | Source: History; Type: Communication; REPLAY_ATTACK |

TABLE I-continued

| Event Type | Event |
|---|---|
| Notification | Source: History; Type: Communication; Replay Attack |
| Notification | Source: History; Type: Configuration; Table Written To |
| Notification | Source: History; Type: StatusEvent; Diagnostic 1 Off |
| Notification | Source: History; Type: StatusEvent; Diagnostic 1 On |
| Notification | Source: History; Type: StatusEvent; Diagnostic 2 Off |
| Notification | Source: History; Type: StatusEvent; Diagnostic 2 On |
| Notification | Source: History; Type: StatusEvent; Load Voltage Present |
| Notification | Source: History; Type: StatusEvent; Loss of Phase Error |
| Notification | Source: History; Type: StatusEvent; Remote connect success |
| Notification | Source: History; Type: StatusEvent; Remote disconnect failed. |
| Notification | Source: History; Type: StatusEvent; Remote disconnect success |
| Notification | Source: History; Type: StatusEvent; SiteScan Error |
| Notification | Source: History; Type: StatusEvent; SiteScan Error Cleared |
| Notification | Source: History; Type: StatusEvent; Time Adjustment Failed |
| Phase Error | Source: History; Type: StatusEvent; Loss of Phase Restore |
| Power Outage | Source:; Type: PowerOutage; |
| Power Outage | Source: History; Type: PowerOutageOrRestoration; Primary Power Down |
| Power Restore | Source:; Type: PowerRestoration; |
| Power Restore | Source: History; Type: PowerOutageOrRestoration; Primary Power Up |
| Remote Connect | Source:; Type: RemoteReconnect; |
| Remote Disconnect | Source:; Type: RemoteDisconnect; |
| Reprogrammed | Source: History; Type: Configuration; Meter Reprogrammed |
| Reverse Rotation | Source:; Type: ReverseRotation; |
| Reverse Rotation | Source: History; Type: StatusEvent; Reverse Rotation Detected |
| Tamper | Source:; Type: TamperAttempt; |
| Tamper | Source: History; Type: StatusEvent; Inversion tamper |
| Tamper | Source: History; Type: StatusEvent; Removal tamper |
| Unknown | Source:; Type: UnknownEvent; |
| Unknown | Source: History; Type: Unknown; Diagnostic 4 Off |
| Unknown | Source: History; Type: Unknown; Diagnostic 4 On |

In comparison, usage/load data may be measured and recorded periodically such as every 15 minutes. For each Meter ID, a frequency count of a number of times each event occurs may be calculated. The frequency counts may be summed into values representing a current month count, a 3-month count, a 6-month count, a 12-month count, etc. for each event.

Data generated by a meter may be delivered through channels that provide particular measures. Table I provides illustrative channels.

TABLE I

| Channel Number | Channel Type | Measurement | Description |
|---|---|---|---|
| 1 | Usage | kWh | kWh value read four times per day, three read every eight hours (32 intervals) and one read for all 24 hours (96 intervals) for actual kWh value |
| 1 | Register | kWh | kWh value cumulative read daily |
| 34 | Register | INV | Instantaneous voltage |
| 1 | Interval | kWh | kWh provided at 15 minute intervals. |
| 11 | Interval | kWh generation (kWhG) | kWhG provided at 15 minute intervals (example of solar or other generation device at premise) |

TABLE I-continued

| Channel Number | Channel Type | Measurement | Description |
|---|---|---|---|
| 3 | Register | kVA | The kVA value may be reset every month and may only be reported if the value exceeds a previous peak |

In an operation 202, a second indicator is received that indicates training dataset 124. For example, the second indicator indicates a location and a name of training dataset 124. Training dataset 124 may or may not already exist. If training dataset 124 already exists, it may be overwritten in an operation 210. As an example, the second indicator may be received by model determination application 128 after selection from a user interface window or after entry by a user into a user interface window. In an alternative embodiment, training dataset 124 may not be selectable. For example, a default dataset may be created and used automatically.

The second indicator further may indicate any rules associated with selecting training dataset 124 from historical electrical system data 122. For example, the second indicator may indicate that all or only a subset of the variables stored in historical electrical system data 122 be used to define training dataset 124. For example, the second indicator indicates a list of variables to use by name, column number, etc. In an alternative embodiment, the second indicator may not be received. For example, all of the variables may be used automatically.

In addition, or in the alternative, the second indicator may indicate that only a subset of the observations stored in historical electrical system data 122 be used to define training dataset 124. For example, a number or a percentage of observations may be defined by the second indicator. A subset of the data points may be created from historical electrical system data 122 by sampling. The second indicator may further indicate a sampling algorithm to use to select the subset of the observations. An example sampling algorithm is uniform sampling though other random sampling algorithms may be used.

In an operation 204, a third indicator is received that indicates validation dataset 126. For example, the third indicator indicates a location and a name of validation dataset 126. Validation dataset 126 may or may not already exist. If validation dataset 126 already exists, it may be overwritten in operation 210. As an example, the third indicator may be received by model determination application 128 after selection from a user interface window or after entry by a user into a user interface window. In an alternative embodiment, validation dataset 126 may not be selectable. For example, a default dataset may be created and used automatically.

The third indicator further may indicate any rules associated with selecting validation dataset 126 from historical electrical system data 122. For example, the third indicator may indicate that all or only a subset of the variables stored in historical electrical system data 122 be used to define validation dataset 126. For example, the third indicator indicates a list of variables to use by name, column number, etc. In an alternative embodiment, the third indicator may not be received. For example, all of the variables may be used automatically.

In addition, or in the alternative, the third indicator may indicate that only a subset of the observations stored in historical electrical system data 122 be used to define validation dataset 126. For example, a number or a percentage of observations may be defined by the third indicator. A subset of the data points may be created from historical electrical system data 122 by sampling. The third indicator may further indicate a sampling algorithm to use to select the subset of the observations. The third indicator further may indicate that the validation dataset 126 includes all of the observations from historical electrical system data 122 not selected for inclusion in training dataset 124.

Training dataset 124 and validation dataset 126 may be selected to include a common set of variables with distinct observations. In an illustrative embodiment, historical electrical system data 122 may be divided into training dataset 124 and validation dataset 126.

In an operation 206, historical electrical system data 122 is read and validated. For example, missing values may be identified and replaced as needed.

In an operation 208, the validated historical electrical system data 122 supplemented with additional computed values. In an illustrative embodiment, the type and number of transformations may be determined based on the variables included in the validated historical electrical system data 122. For example, log values, log 10 values, inverse values, square root values, square values, exponential values, etc. may be computed for various variables associated with one or more event included in the validated historical electrical system data 122.

As additional examples, the individual counts for each meter for one or more events may be computed for various time intervals such as for the last month, the last two months, the last 3 months, the last six months, the last year, etc. A transformer may have many meters assigned to it. A meter count may be computed indicating a number of meters assigned to a transformer and the transformed historical electrical system data 122 supplemented with this information for each transformer. Corresponding counts and values for a transformer are computed from the meter data associated with the meters connected to that transformer.

For example, the percent the transformer is busy may be computed from the load and usage data from the meter data associated with the meters connected to that transformer and is referred to as a transformer utilization, $T_U$. The kilowatt (kW) reading from the individual meters may be converted to match the kWh and adjusted by the power factor, PF, determined by each utility. Additionally, the transformer rating, $T_r$, may also be determined. This may be done by adding a phase rating of the transformer provided by the transformer attributes. For illustration, transformer utilization may be computed using:

$$T_r = \Sigma(\text{ratedkVA}, \text{ratedkVA2}, \text{ratedkVA3})$$

$$PF = 0.9$$

$$T_U = ((kWh*4/PF)/T_r)*100$$

where ratedkVA, ratedkVA2, ratedkVA3 are the rated kVA for each meter assigned to the respective transformer. Transformed historical electrical system data 122 further may be supplements with a number of intervals for which $T_U > 100$ for various time periods (i.e., last month, the last two months, the last 3 months, the last six months, the last year).

Additional values computed for the meters and summed for the transformer servicing them to supplement the validated historical electrical system data 122 include:

OutofRange1, OutofRange3, OutofRange6, OutofRange12, which are counters of the number of times a meter experiences an out of range event for the current month, the last 3-months, the last 6-months, and the last 12-months;

ReverseRotation1, ReverseRotation3, ReverseRotation6, ReverseRotation12, which are counters of the number of times a meter registers a reverse rotation event for the current month, the last 3-months, the last 6-months, and the last 12-months;

PhaseError1, PhaseError3, PhaseError6, PhaseError12, which are counters of the number of times a meter registers a phase error event for the current month, the last 3-months, the last 6-months, and the last 12-months;

PowerOutage1, PowerOutage3, PowerOutage6, PowerOutage12, which are counters of the number of times a meter registers a power outage event for the current month, the last 3-months, the last 6-months, and the last 12-months;

PowerOutagedur1, PowerOutagedur3, PowerOutagedur6, PowerOutagedur12, which are values of an accumulated time in minutes of the power outage event for the current month, the last 3-months, the last 6-months, and the last 12-months;

PowerOff1, PowerOff3, PowerOff6, PowerOff12, which are counters of the number of times a meter registers a power-off event for the current month, the last 3-months, the last 6-months, and the last 12-months;

PowerOffdur1, PowerOffdur3, PowerOffdur6, PowerOffdur12, which are values of an accumulated time in minutes of the power-off event for the current month, the last 3-months, the last 6-months, and the last 12-months;

PowerOffrecent, which is a value of a percentage of time a meter is powered off versus online (powered);

OutOfRng1, OutOfRng3, OutOfRng6, OutOfRng12, which are counters of a number of times a transformer's busy count exceeds a transformer rating (a value greater than 1) for the current month, the last 3-months, the last 6-months, and the last 12-months;

OutOfRngrecent, which is a value of a percentage of time the transformer is out of range versus in range; and fail_count1, fail_count3, fail_count6, fail_count12, which are counters of a number of missing meter reads, which occur when a meter does not report any values for the current month, the last 3-months, the last 6-months, and the last 12-months.

In operation 210, the supplemented historical electrical system data 122 is partitioned to define training dataset 124 and validation dataset 126 based on the second indicator and the third indicator, respectively.

In an operation 212, a fourth indicator is received that indicates an analysis type. As an example, the fourth indicator may be received by model determination application 128 after selection from a user interface window or after entry by a user into a user interface window. For example, the analysis type may be selectable between "basic", "intermediate", "advanced", and "best overall". Of course, other indicator may be used to indicate the analysis type. As another example, numerical indicators such as 1, 2, 3, or 4 may be used.

In an operation 214, statistics are computed for the variables included in training dataset 124. The statistics are used to define an input variable's worth and/or importance. The variables from training dataset 124 are rated to evaluate for inclusion when training one or more models. For example, minimum, maximum, mean, standard deviation, and skewness values may be computed for one or more of the variables included in training dataset 124. Chi-square statistics further may be computed for the variables included in training dataset 124. For example, r-squared and/or chi-squared rating values may be computed to determine the input variable's worth and/or importance. For illustration, a variable rating can be performed using binary variable splits for maximizing the chi-squared or r-squared values. The result is a decision tree representing a segmentation of the data created by applying a series of simple rules. Each rule assigns an observation to a segment based on the value of one input. One rule is applied after another, resulting in a hierarchy of segments within segments. The hierarchy is called a tree, and each segment is called a node. The original segment contains the entire data set and is called the root node of the tree. A node with all its successors forms a branch of the node that created it. The final nodes are called leaves. For each leaf, a decision is made and applied to all observations in the leaf. The solution allows variables to override the automatic selection process by allowing rejected variable as an input variable. R-squared rating values may be computed by rating variables and their interactions (sequential leaves and branches) based on minimizing an error probability, while chi-squared rating values may be computed by rating variables and their interactions based on maximizing the chi-squared value.

In an operation 216, variables are selected from the supplemented historical electrical system data 122 based on the analysis type selected and the computed worth for each variable. For example, if the analysis type is 1 (basic), the 100 highest worth variables may be selected. If the analysis type is 2 (intermediate), the 200 highest worth variables may be selected. If the analysis type is 3 (advanced), the 500 highest worth variables may be selected. If the analysis type is 4 (best overall), the 100 highest worth variables may be selected to define a type 1 model, the 200 highest worth variables may be selected to define a best type 2 model, and the 500 highest worth variables may be selected to define a best type 3 model. A fewer or a greater number of analysis types may be defined. Additionally, different number of variables may be defined for each analysis type.

If the analysis type is 1 (basic), the 100 highest worth variables may be selected from the supplemented historical electrical system data 122 associated with the weather information and the meter interval usage data. If the analysis type is 2 (intermediate), the 200 highest worth variables may be selected from the supplemented historical electrical system data 122 associated with the meter event information, the meter interval usage data, and the transformer attribute information. If the analysis type is 3 (advanced), the 500 highest worth variables may be selected from the supplemented historical electrical system data 122 associated with the customer information, location information, weather information, meter attribute information, meter maintenance information, meter event information, meter interval usage, transformer attribute information, etc.

In an operation 218, a determination is made concerning whether or not analysis type 1 or 4 was selected in operation 212. When analysis type 1 or 4 was selected, processing continues in an operation 220. When analysis type 1 or 4 was not selected, processing continues in an operation 236.

In an operation 220, a forward regression model is trained using values from training dataset 124 of the highest worth variables selected for analysis type 1. The forward regression model predicts a probability that a failure (binary, ordinal, or nominal) target will occur as a function of one or more independent variables. The forward regression model chooses variables from training dataset 124 and the highest worth variables one at a time in a stepwise process. The stepwise process adds one variable at a time to the linear equation until the variable contributions are insignificant. The forward regression model also excludes variables with no predictive ability (or variables that are highly correlated with other predictor variables) from the analytic analysis.

In an operation 222, the trained forward regression model is validated using validation dataset 126 to compare the model's predictions to the known target values and to statistically assess the model's fit. Summary statistical values that statistically assess the model's fit include a misclassification rate, a percent correct, a maximum absolute error, a mean error, a mean square error, a sum of squared errors, a mean of the squared errors, a square root of the mean of the squared errors, etc.

In an operation 224, the trained forward regression model and statistical values associated with the statistical assessment of the model's fit are stored in computer-readable medium 108 and/or on distributed computing system 134 as a best type 1 model.

In an operation 226, a determination is made concerning whether or not analysis type 1 was selected in operation 214. When analysis type 1 was selected, processing continues in an operation 227. When analysis type 1 was not selected, processing continues in operation 236.

In operation 227, the best type 1 model is stored as probability of failure model 130 in computer-readable medium 108 and/or on distributed computing system 134.

Referring to FIG. 2D, in an operation 228, a fourth indicator is received that indicates new electrical system data 131. For example, the fourth indicator indicates a location and a name of new electrical system data 131. As an example, the fourth indicator may be received by model determination application 128 after selection from a user interface window or after entry by a user into a user interface window. In an alternative embodiment, new electrical system data 131 may not be selectable. For example, a most recently created dataset may be used automatically.

In an operation 230, new electrical system data 131 is validated and supplemented in a manner similar to that described in operations 206 and 208 with reference to historical electrical system data 122. New electrical system data 131 may include similar measured and computed values as described with reference to historical electrical system data 122 except that new electrical system data 131 does not include an indication of whether or not a failure has occurred.

In an operation 232, the stored probability of failure model 130 is executed with all or a portion of new electrical system data 131. Execution of probability of failure model 130 computes a probability of failure for each transformer included in all or the portion of new electrical system data 131. For illustration, the portion of new electrical system data 131 used may be any data included in new electrical system data 131 that has not previously been evaluated using the stored probability of failure model 130.

In an operation 234, transformer status database 132 is updated with the newly computed probability of failure for each transformer. As part of updating transformer status database 132 reports may be updated and output. For example, statistical results associated with the update may be stored on one or more devices and/or on computer-readable medium 108 in a variety of formats as understood by a person of skill in the art. For example, identifying transformer outages and transformers with the highest outage frequency or duration may be provided in an outage summary report. Identifying transformers with overload occurrences and dissecting the overload by the contributing meters can be used by field engineers and analysts to determine appropriate actions.

Transformer status database 132 further may be output to display 116, to printer 120, to speaker 118, etc. In an illustrative embodiment, an alert message may be sent to another device using communication interface 106, printed on printer 120 or another printer, presented visually on display 116 or another display, presented audibly using speaker 118 or another speaker when a probability of failure value exceeds an alarm threshold. Various alarm levels may be defined based on the probability of failure value. The alert message may indicate that a maintenance crew be dispatched to repair/replace the associated transformer within a time period based on the probability of failure value.

Figure 3:
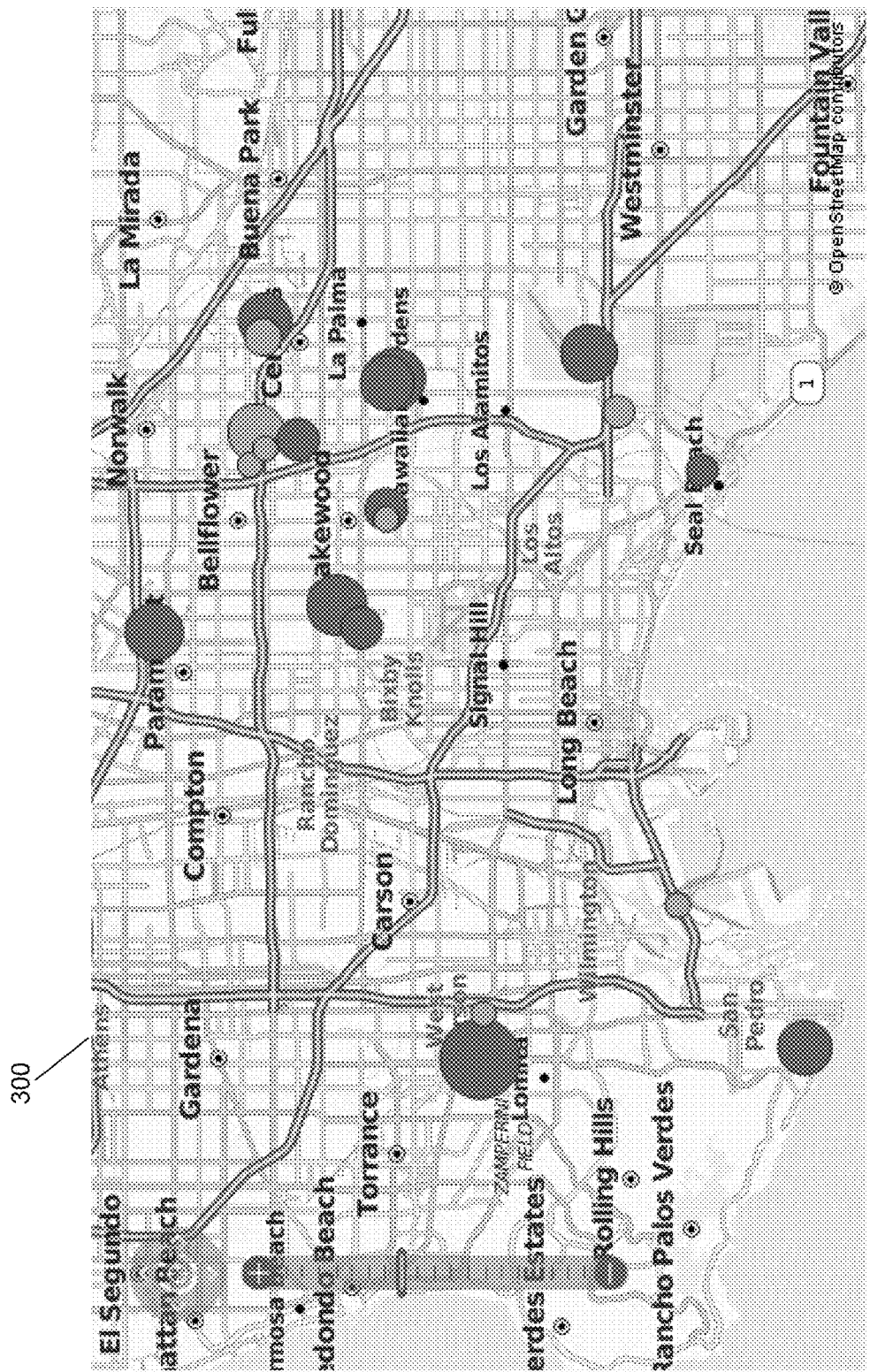
FIG. 3 shows a map of electrical transformer locations in accordance with an illustrative embodiment.

Referring to FIG. 3, a map of electrical transformer locations is shown in accordance with an illustrative embodiment. An indicator may indicate a location and the probability of failure of a plurality of transformers within a geographic region.

Figure 4:
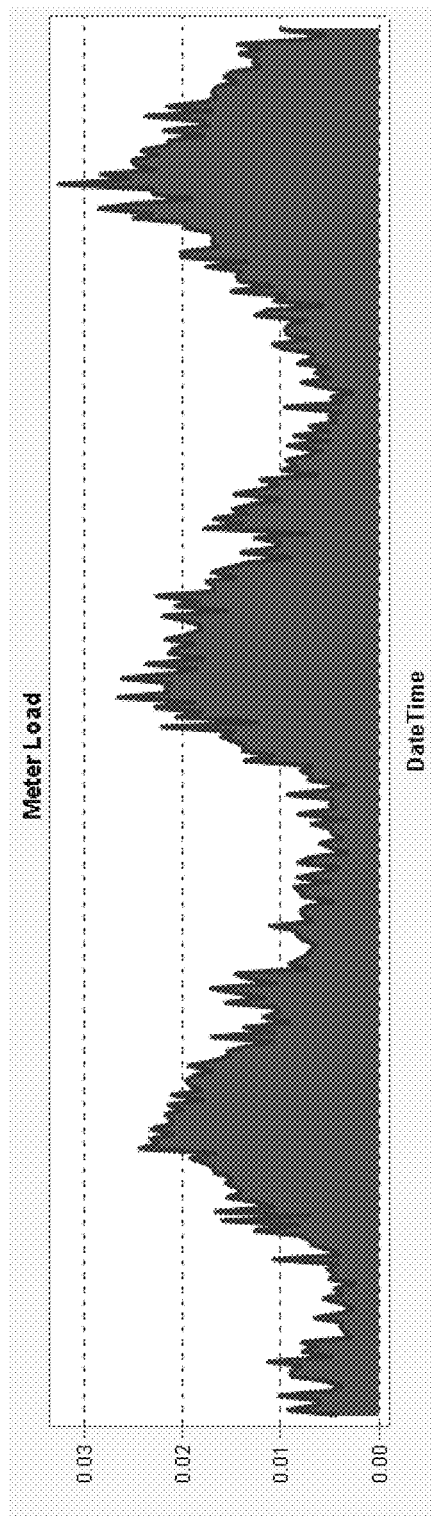
FIG. 4 shows a load graph for an electrical meter connected to a transformer as a function of time in accordance with an illustrative embodiment.
Figure 5:
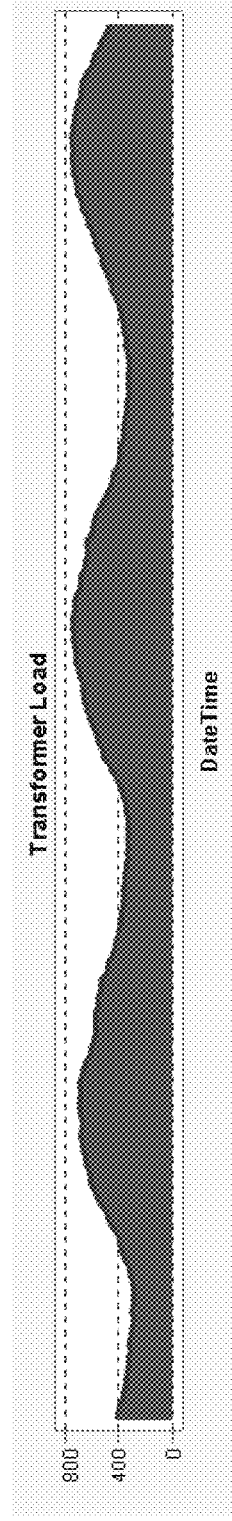
FIG. 5 shows a load graph for a transformer as a function of time in accordance with an illustrative embodiment.

Referring to FIG. 4, a load graph for an electrical meter connected to a transformer as a function of time is shown in accordance with an illustrative embodiment. Referring to FIG. 5, a load graph for a transformer as a function of time is shown in accordance with an illustrative embodiment. For illustration, by "double-clicking" on a transformer on the map of FIG. 3, the load (energy demand) on a transformer is presented as shown in FIG. 5. The load from each meter can also be viewed as shown in FIG. 4 to provide a visual root cause in a case of an overload. Simultaneously, a transformer location may be provided as well as a location of the meters to which the transformer is connected.

Figure 6:
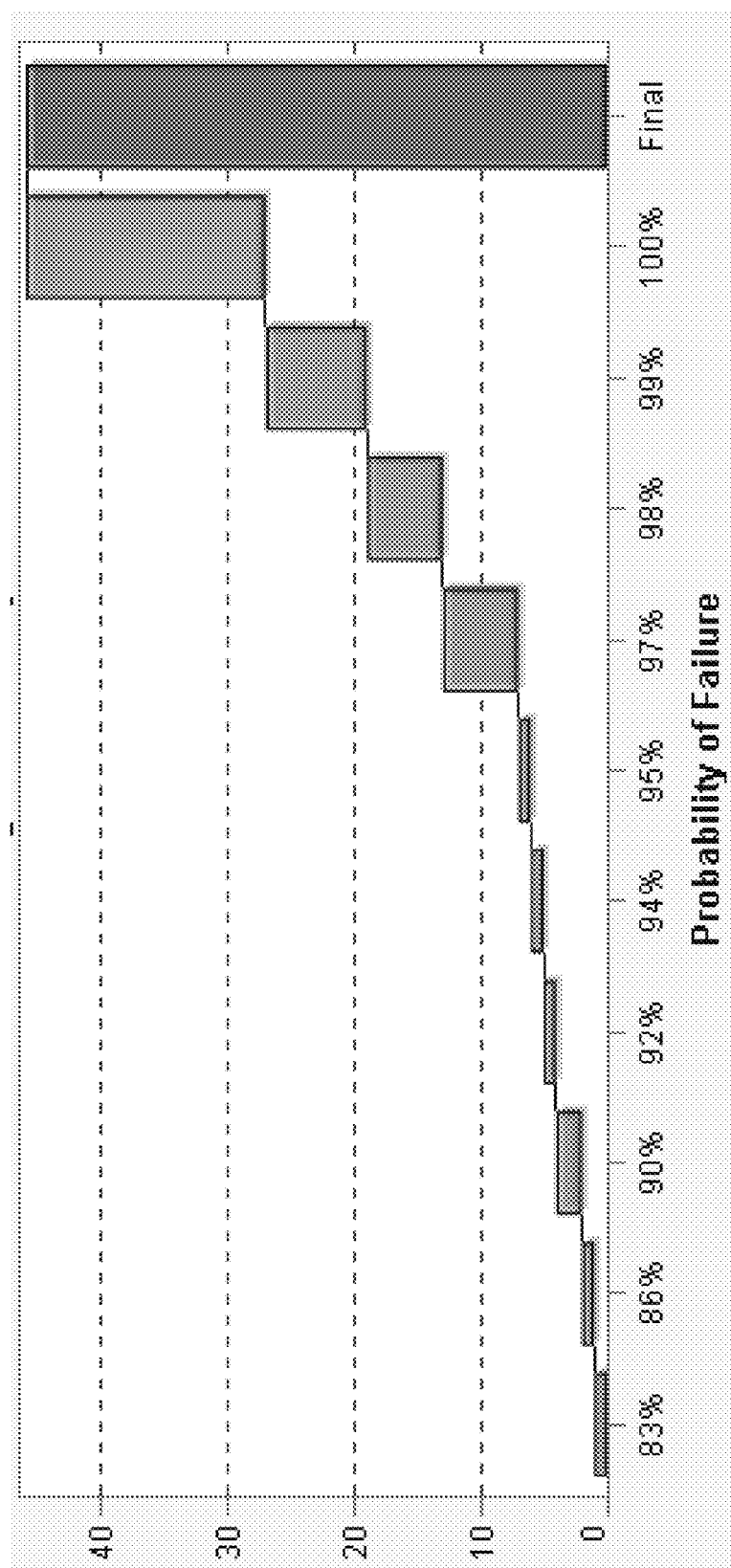
FIG. 6 shows a failure probability graph for an electrical system as a function of a probability of failure in accordance with an illustrative embodiment.

Referring to FIG. 6, a failure probability graph for an electrical system as a function of a probability of failure is shown in accordance with an illustrative embodiment. For example, transformers with a probability of failure that exceeds a predefined threshold may be included in the failure probability graph. In FIG. 6, a count of transformers with a probability of failure greater than 83% is shown.

Referring to FIG. 7, a failure probability table for an electrical system is shown in accordance with an illustrative embodiment. For example, the failure probability table may provide a visualization of transformer status database 132 that can be sorted by various variable values.

Figure 8:
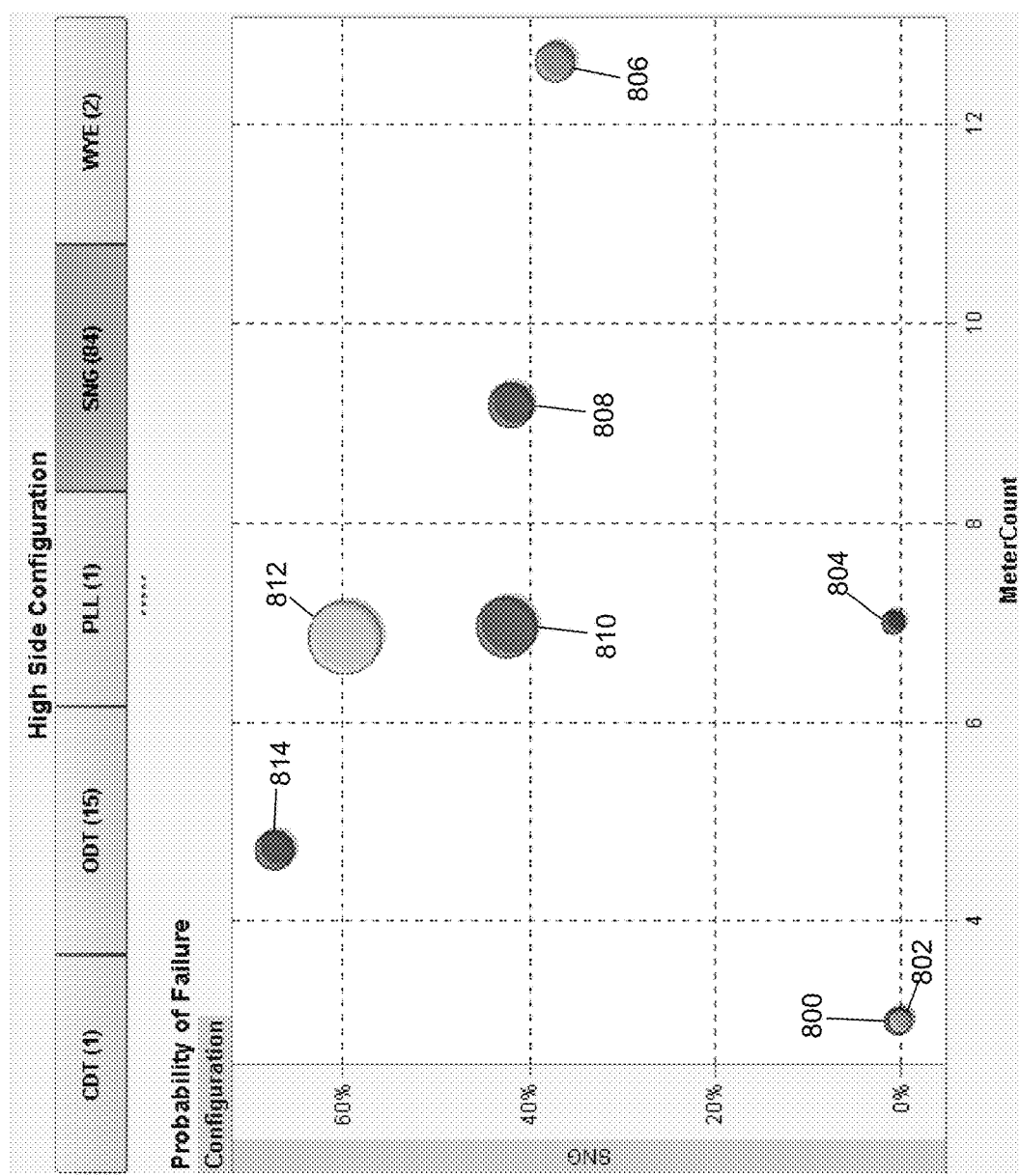
FIG. 8 shows a failure probability graph for an electrical system as a function of a meter count for an SNG type transformer in accordance with an illustrative embodiment.

Referring to FIG. 8, a failure probability graph for an electrical system as a function of a meter count for an SNG type transformer is shown in accordance with an illustrative embodiment. A first meter type indicator 800 indicates a 37 kVA rated SNG type transformer, a second meter type indicator 802 indicates a 250 kVA rated SNG type transformer, a third meter type indicator 804 indicates a 47 kVA rated SNG type transformer, a fourth meter type indicator 806 indicates a 167 kVA rated SNG type transformer, a fifth meter type indicator 808 indicates a 100 kVA rated SNG type transformer, a sixth meter type indicator 810 indicates a 75 kVA rated SNG type transformer, a seventh meter type indicator 812 indicates a 50 kVA rated SNG type transformer, and an eighth meter type indicator 814 indicates a 25 kVA rated SNG type transformer. A size of each meter type indicator indicates a number of transformers of that type where first meter type indicator 800 indicates a single transformer of that type, and seventh meter type indicator 812 indicates 30 transformers of that type. The illustrative results of FIG. 8 show probabilities of failure averaged for each kVA rating of the SNG type transformer.

Figure 9:
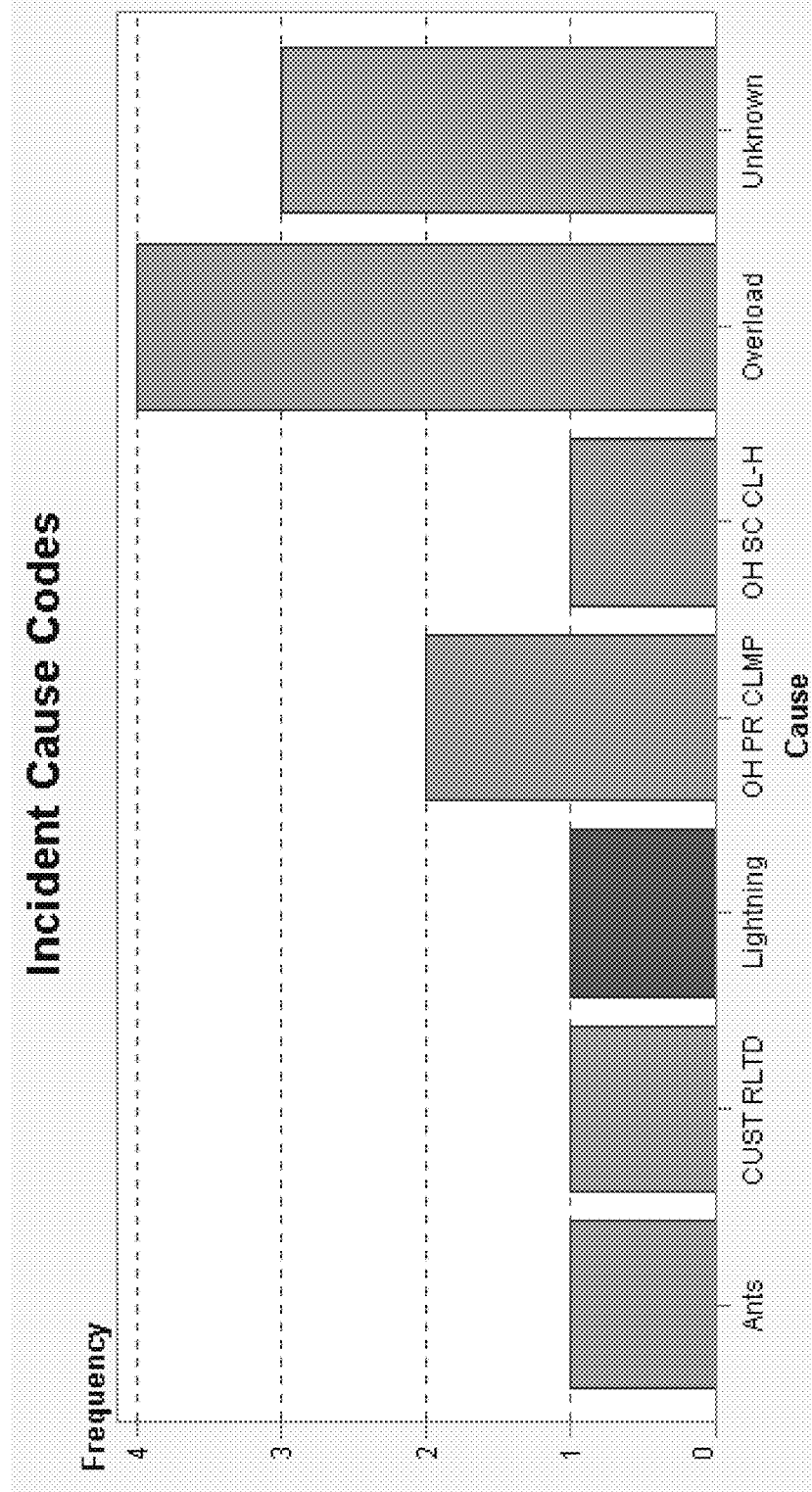
FIG. 9 shows an incident cause graph for an electrical system as a function of an incident type in accordance with an illustrative embodiment.

Referring to FIG. 9, an incident cause graph for an electrical system as a function of an incident type is shown in accordance with an illustrative embodiment. After responding to a repair/replace transformer alert, a cause of the failure may be determined and entered into transformer status database 132. Illustrative causes of a transformer failure may include ants, customer error, overload, lightning, unknown, etc.

Referring again to FIG. 2D, processing continues in operation 228 to continue processing new electrical system data 131 as new data is received, periodically, when instructed by a user, etc.

Figure 2B:
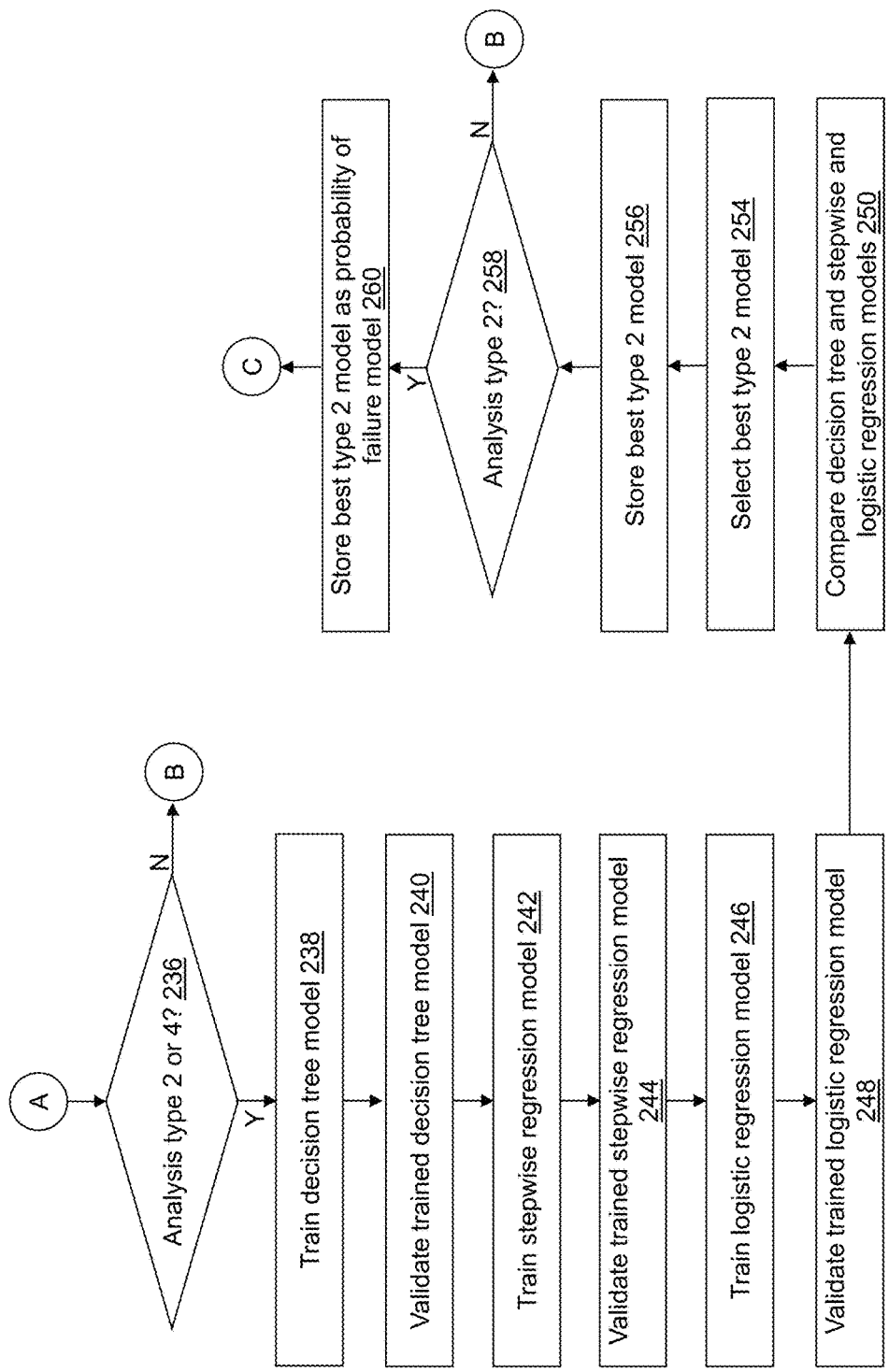
Figure 2C:
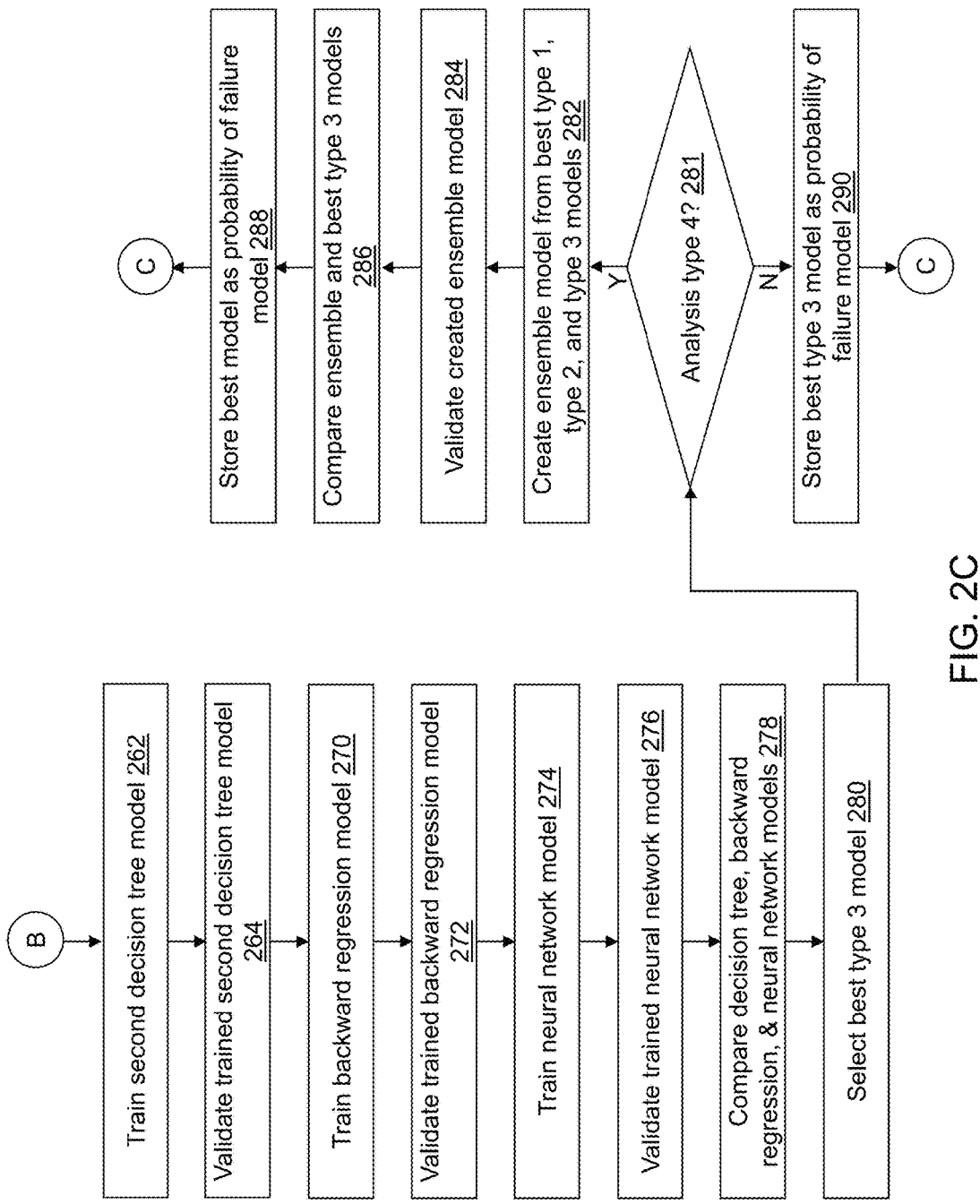

Referring to FIG. 2B, in an operation 236, a determination is made concerning whether or not analysis type 2 or 4 was selected in operation 212. When analysis type 2 or 4 was selected, processing continues in an operation 238. When analysis type 2 or 4 was not selected, processing continues in an operation 262.

In an operation 238, a decision tree model is trained using values from training dataset 124 of the highest worth variables selected for analysis type 2. The decision tree model creates a "tree" structure of simple rules representing a segmentation of data. Each rule assigns an observation to a segment based on a value of a single input. One rule is applied after another resulting in a hierarchy of segments within segments. The decision tree model removes variables with a lowest worth until all variables that provide no significant contribution are eliminated.

In an operation 240, the trained decision tree model is validated using validation dataset 126 to compare the model's predictions to the known target values and to statistically assess the model's fit by computing one or more of the summary statistical values.

In an operation 242, a stepwise regression model is trained using values from training dataset 124 of the highest worth variables selected for analysis type 2. The stepwise regression model chooses variables from the highest worth variables selected for analysis type 2 one at a time in a stepwise process starting with a highest rated variable. The stepwise process adds one variable at a time to the linear equation until the variable contributions are insignificant. The stepwise regression model seeks to exclude variables with no predictive ability (or variables that are highly correlated with other predictor variables) from the analytic analysis.

In an operation 244, the trained stepwise regression model is validated using validation dataset 126 to compare the model's predictions to the known target values and to statistically assess the model's fit by computing one or more of the summary statistical values.

In an operation 246, a logistic regression model is trained using values from training dataset 124 of the highest worth variables selected for analysis type 2. Target variables for the logistic regression model are integers, usually binary, for example, that indicate a success or a failure. Training dataset 124 is first submitted to a decision tree that creates a NODE_ID variable that is passed as input to the logistic regression model. The NODE_ID variable is created to enable variable interaction models so that each variable is not treated as an independent entity.

In an operation 248, the logistic regression tree model is validated using validation dataset 126 to compare the model's predictions to the known target values and to statistically assess the model's fit by computing one or more of the summary statistical values.

In an operation 250, the trained decision tree model, the trained stepwise regression model, and the logistic regression tree model are compared. A validation error can be computed for each trained model based on the results generated using validation dataset 126. For illustration, the validation error may be one or more of the summary statistical values computed for each model.

In an operation 254, a best type 2 model is selected based on the comparison. For example, the best type 2 model selected is the model of the trained decision tree model, the trained stepwise regression model, and the logistic regression tree model having the smallest validation error.

In an operation 256, the selected best type 2 model and statistical values associated with the statistical assessment of the model's fit including the validation error are stored in computer-readable medium 108 and/or on distributed computing system 134.

In an operation 258, a determination is made concerning whether or not analysis type 2 was selected in operation 214. When analysis type 2 was selected, processing continues in an operation 260. When analysis type 2 was not selected, processing continues in an operation 262.

In operation 260, the best type 2 model is stored as probability of failure model 130 in computer-readable medium 108 and/or on distributed computing system 134. Processing continues in operation 228 to process new electrical system data 131 as new data is received, periodically, when instructed by a user, etc.

In operation 262, a second decision tree model is trained using values from training dataset 124 of the highest worth variables selected for analysis type 3.

In an operation 264, the trained second decision tree model is validated using validation dataset 126 to compare the model's predictions to the known target values and to statistically assess the model's fit by computing one or more of the summary statistical values.

In an operation 270, a backward regression model is trained using values from training dataset 124 of the highest worth variables selected for analysis type 3. The backward regression model is a linear regression model that eliminates variables by removing one variable at a time until the r-squared value computed in operation 236 drops significantly. For example, a statistical significance test using the r-squared value embedded within the modeling process rejects variables whose worth does not meet a predefined significance level, p, such as p>0.05.

In an operation 272, the trained backward regression model is validated using validation dataset 126 to compare the model's predictions to the known target values and to statistically assess the model's fit by computing one or more of the summary statistical values.

In an operation 274, a neural network model is trained using values from training dataset 124 of the highest worth variables selected for analysis type 3. The neural network model conducts limited searches to find an optimal feedforward network.

In an operation 276, the neural network model is validated using validation dataset 126 to compare the model's predictions to the known target values and to statistically assess the model's fit by computing one or more of the summary statistical values.

In an operation 278, the trained second decision tree model, the trained backward regression model, and the neural network model are compared in a manner similar to that described referring to operation 250.

In an operation 280, a best type 3 model is selected based on the comparison. For example, the best type 3 model selected is the model of the trained second decision tree model, the trained backward regression model, and the neural network model having the smallest validation error.

In an operation 281, a determination is made concerning whether or not analysis type 4 was selected in operation 214. When analysis type 4 was selected, processing continues in an operation 282. When analysis type 4 was not selected, processing continues in an operation 290.

In operation 282, an ensemble model is created from the best type 1 model, the best type 2 model, and the best type 3 model. An ensemble model is a collection of models regarded as one combined model. The ensemble predicts a target value as an average or a vote of the predictions of the individual models. The different individual models can give different weights to the average or vote. The ensemble model may average a posterior probability of the target values determined by each model. Alternatively, the ensemble model may classify a case into the class that most of the individual models select.

In an operation 284, the created ensemble model is validated using validation dataset 126 to compare the model's predictions to the known target values and to statistically assess the model's fit by computing one or more of the summary statistical values.

In an operation 286, the created ensemble model and the best type 3 model are compared in a manner similar to that described referring to operation 250.

In an operation 288, the best model of the created ensemble model and the best type 3 model having the smallest validation error is stored as probability of failure model 130 in computer-readable medium 108 and/or on distributed computing system 134. Processing continues in operation 228 to process new electrical system data 131 as new data is received, periodically, when instructed by a user, etc.

In operation 290, the selected best type 3 model is stored as probability of failure model 130 in computer-readable medium 108 and/or on distributed computing system 134. Processing continues in operation 228 to process new electrical system data 131 as new data is received, periodically, when instructed by a user, etc.

The operations of FIGS. 2A, 2B, 2C, and 2D may be distributed between one or more applications that are integrated or that are independent. The operations of FIGS. 2A, 2B, 2C, and 2D further may be performed using different devices. For example, a first computing device may determine probability of failure model 130, and a second computing device may update transformer status database 132 using the determined probability of failure model 130.

Figure 10:
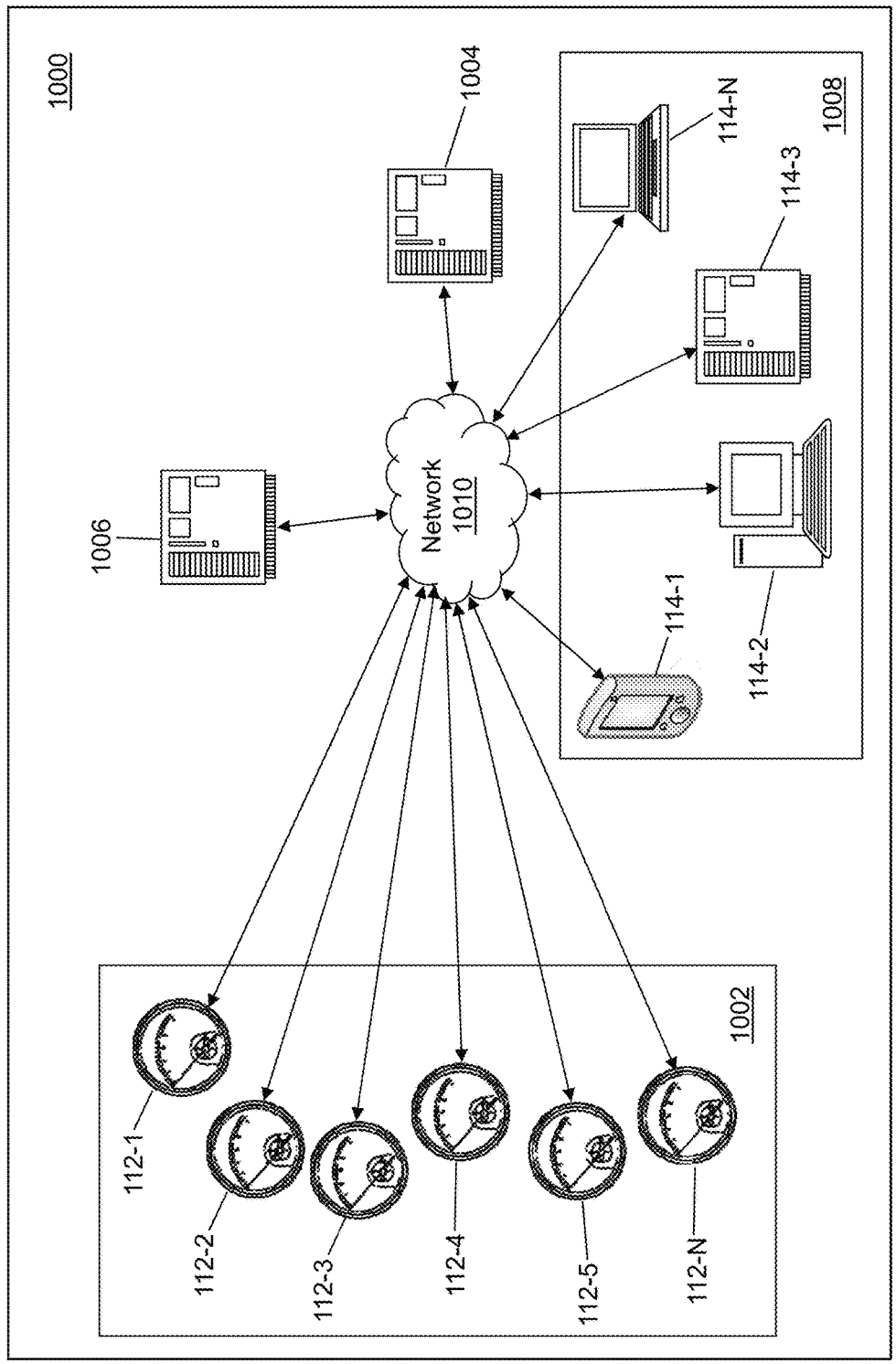
FIG. 10 depicts a block diagram of a failure prediction stream processing system in accordance with an illustrative embodiment.

Referring to FIG. 10, a block diagram of a failure prediction stream processing system 1000 is shown in accordance with an illustrative embodiment. In an illustrative embodiment, stream processing system 1000 may include an electrical data publishing system 1002, an ESP device 1004, a second failure prediction device 1006, a status monitoring system 1008, and a network 1010. Each of electrical data publishing system 1002, ESP device 1004, second failure prediction device 1006, and status monitoring system 1008 may be composed of one or more discrete devices in communication through network 1010.

Electrical data publishing system 1002 includes a plurality of electrical data publishing devices. For illustration, electrical data publishing system 1002 includes a first publishing device 112-1, a second publishing device 112-2, a third publishing device 112-3, a fourth publishing device 112-4, a fifth publishing device 112-5, and an $n^{th}$ publishing device 112-N. Each electrical data publishing device includes, is integrated with, and/or communicates with one or more sensors that produce sensor signal values referred to as measurement data values. A sensor may measure a physical quantity in an environment to which the sensor is associated and generate a corresponding measurement datum that typically is associated with a time that the measurement datum is generated. The environment to which the sensor is associated for monitoring includes a power usage at a location. Example sensors include a pressure sensor, a temperature sensor, a position or location sensor, a voltage sensor, a current sensor, a frequency sensor, a phase angle sensor, a humidity sensor, a dewpoint sensor, etc. that may be mounted to various components used as part of the system such as an electrical meter.

The electrical data publishing system 1002 publishes the sensor measurements to ESP device 1004. ESP device 1004 receives the sensor measurements in an event stream and may validate, transform, and/or supplement the sensor measurement values included in the event stream before sending events to second failure prediction device 1006. Second failure prediction device 1006 receives the events and updates a probability of transformer failure using the received events. Status monitoring system 1008 receives updated status data and outputs the updated status. The status monitoring system 1008 may include transformer status database 132, a system control operator display system, a post-failure analysis device, a failure notification device, an incident cause database, etc. that present illustrative output as shown in FIGS. 3 to 9. Status monitoring system 1008 and second failure prediction device 1006 may be integrated into a single computing device.

ESP device 1004 and second failure prediction device 1006 may be integrated into a single computing device. In an alternative embodiment, ESP device 1004 further may update the probability of transformer failure using the received sensor measurements.

Network 1010 may include one or more networks of the same or different types. Network 1010 can be any type of wired and/or wireless public or private network including a cellular network, a local area network, a wide area network such as the Internet or the World Wide Web, etc. Network 1010 further may comprise sub-networks and consist of any number of communication devices.

Figure 11:
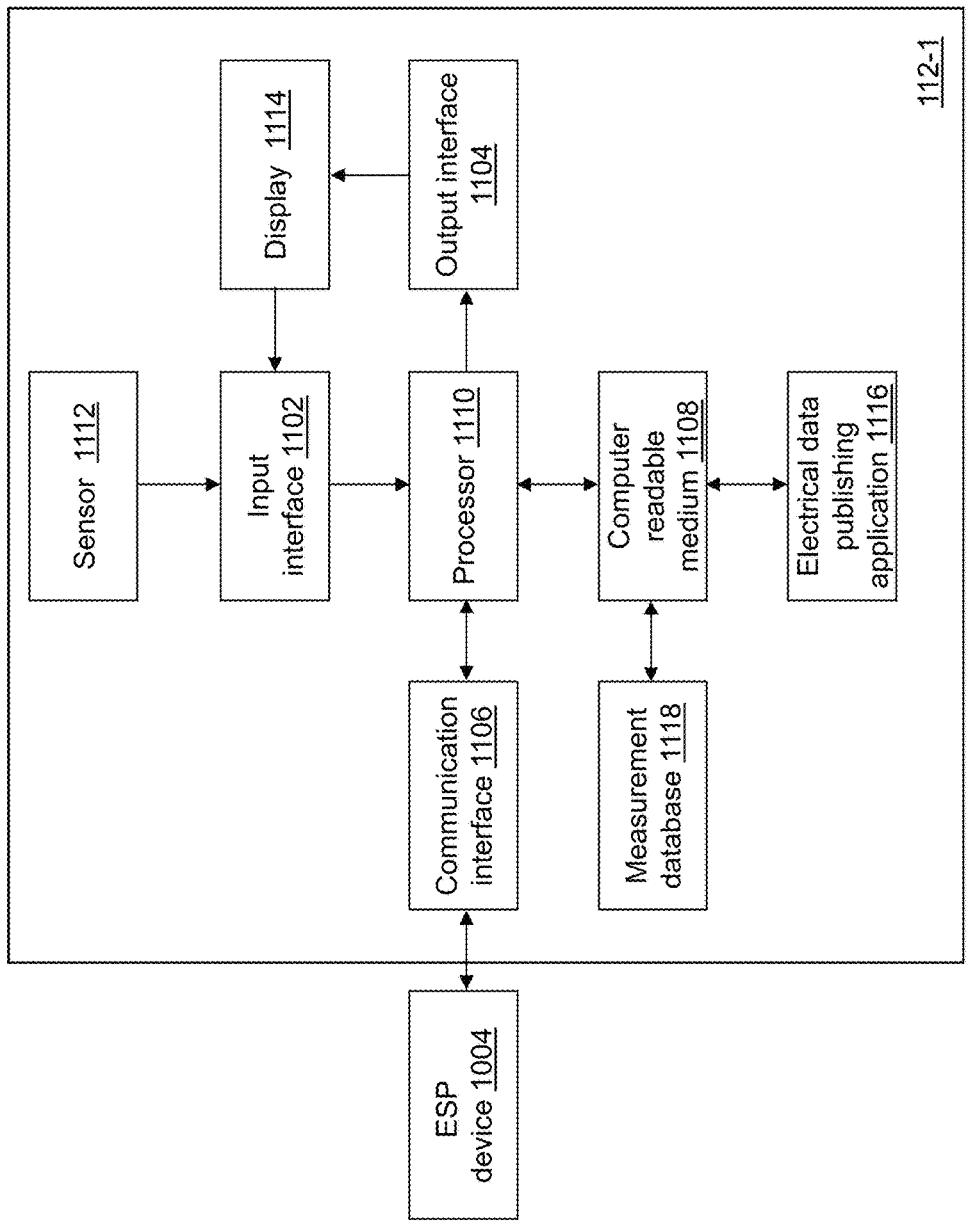
FIG. 11 depicts an electrical data publishing system of the stream processing system of FIG. 10 in accordance with an illustrative embodiment.

The one or more computing devices of electrical data publishing system 1002 may include computers of any form factor such as a server computer, a desktop, a smart phone, a laptop, a personal digital assistant, an integrated messaging device, a tablet computer, etc. Referring to FIG. 11, electrical data publishing system 1002 can include any number and any combination of form factors of computing devices that may be organized into subnets. The computing devices of electrical data publishing system 1002 send and receive signals through network 1010 to/from another of the one or more computing devices of electrical data publishing system 1002 and/or to/from ESP device 1004. The one or more computing devices of electrical data publishing system 1002 may communicate using various transmission media that may be wired and/or wireless as understood by those skilled in the art.

ESP device 1004 can include any form factor of computing device. For illustration, FIG. 10 represents ESP device 1004 as a server computer. In general, a server computer may include faster processors, additional processors, more disk memory, and more RAM than a client computer and support multi-threading as understood by a person of skill in the art. ESP device 1004 sends and receives signals through network 1010 to/from the devices of electrical data publishing system 1002 and/or to/from second failure prediction device 1006 and/or to/from status monitoring system 1008.

ESP device 1004 may communicate using various transmission media that may be wired and/or wireless as understood by those skilled in the art. ESP device 1004 may be implemented on a plurality of computing devices of the same or different type. Stream processing system 100 further may include a plurality of ESP devices. For example, ESP device 1004 may subscribe to a first event stream published by a first ESP device and publish a second event stream, for example, to second failure prediction device 1006. For further illustration, the first ESP device may be associated with a first subset of the devices of electrical data publishing system 1002, a second ESP device may be associated with a second subset of the devices of electrical data publishing system 1002, etc.

Second failure prediction device 1006 can include any form factor of computing device. For illustration, FIG. 10 represents second failure prediction device 1006 as a server computer. Second failure prediction device 1006 sends and receives signals through network 1010 to/from ESP device 1004 and/or to/from status monitoring system 1008. Second failure prediction device 1006 may communicate using various transmission media that may be wired and/or wireless as understood by those skilled in the art.

Status monitoring system 1008 may include a plurality of status monitoring devices. For illustration, status monitoring system 1008 includes a first status monitoring device 114-1, a second status monitoring device 114-2, a third status monitoring device 114-3, and an $n^{th}$ status monitoring device 114-N. Referring to FIG. 10, the one or more computing devices of status monitoring system 1008 may include computers of any form factor such as a smart phone, a desktop, a server computer, a laptop, a personal digital assistant, an integrated messaging device, a tablet computer, etc. Status monitoring system 1008 can include any number and any combination of form factors of computing devices. The computing devices of status monitoring system 1008 send and receive signals through network 1010 to/from ESP device 1004 and/or to/from second failure prediction device 1006. The one or more computing devices of status monitoring system 1008 may communicate using various transmission media that may be wired and/or wireless as understood by those skilled in the art.

Referring to FIG. 11, a block diagram of first publishing device 112-1 is shown in accordance with an example embodiment. First publishing device 112-1 is an example computing device of electrical data publishing system 1002. First publishing device 112-1 may include a second input interface 1102, a second output interface 1104, a second communication interface 1106, a second computer-readable medium 1108, a second processor 1110, an electrical data publishing application 1116, and measurement database 1118. Fewer, different, and additional components may be incorporated into first publishing device 112-1. The devices of electrical data publishing system 102 may be geographically dispersed from each other and/or co-located. Each first publishing device 112-1 of electrical data publishing system 102 may include the same or different components and combinations of components.

Second input interface 1102 provides the same or similar functionality as that described with reference to input interface 102 of failure prediction device 100 though referring to first publishing device 112-1. Second output interface 1104 provides the same or similar functionality as that described with reference to output interface 104 of failure prediction device 100 though referring to first publishing device 112-1. Second communication interface 1106 provides the same or similar functionality as that described with reference to communication interface 106 of failure prediction device 100 though referring to first publishing device 112-1. Data and messages may be transferred between first publishing device 112-1 and ESP device 1004 using second communication interface 1106. Second computer-readable medium 1108 provides the same or similar functionality as that described with reference to computer-readable medium 108 of failure prediction device 100 though referring to first publishing device 112-1. Second processor 1110 provides the same or similar functionality as that described with reference to processor 110 of failure prediction device 100 though referring to first publishing device 112-1.

Electrical data publishing application 1116 performs operations associated with generating and/or receiving measurement data from a sensor 1112 and publishing the measurement data in an event stream to ESP device 1004 directly or indirectly through an intermediate device such as the first ESP device. Electrical data publishing application 1116 may receive sensor measurements from one or more sensors of various types at various data rates that are either periodic or on command. Electrical data publishing application 1116 further may compute additional measurement data using the received measurement data. The operations may be implemented using hardware, firmware, software, or any combination of these methods. Referring to the example embodiment of FIG. 115, electrical data publishing application 1116 is implemented in software (comprised of computer-readable and/or computer-executable instructions) stored in second computer-readable medium 1108 and accessible by second processor 1110 for execution of the instructions that embody the operations of electrical data publishing application 1116. Electrical data publishing application 1116 may be written using one or more programming languages, assembly languages, scripting languages, etc. Electrical data publishing application 1116 may be implemented as a Web application.

As used herein, measurement database 1118 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Measurement database 1118 may be implemented using various formats as known to those skilled in the art including a file system, a relational database, a system of tables, a structured query language database, etc.

Figure 12:
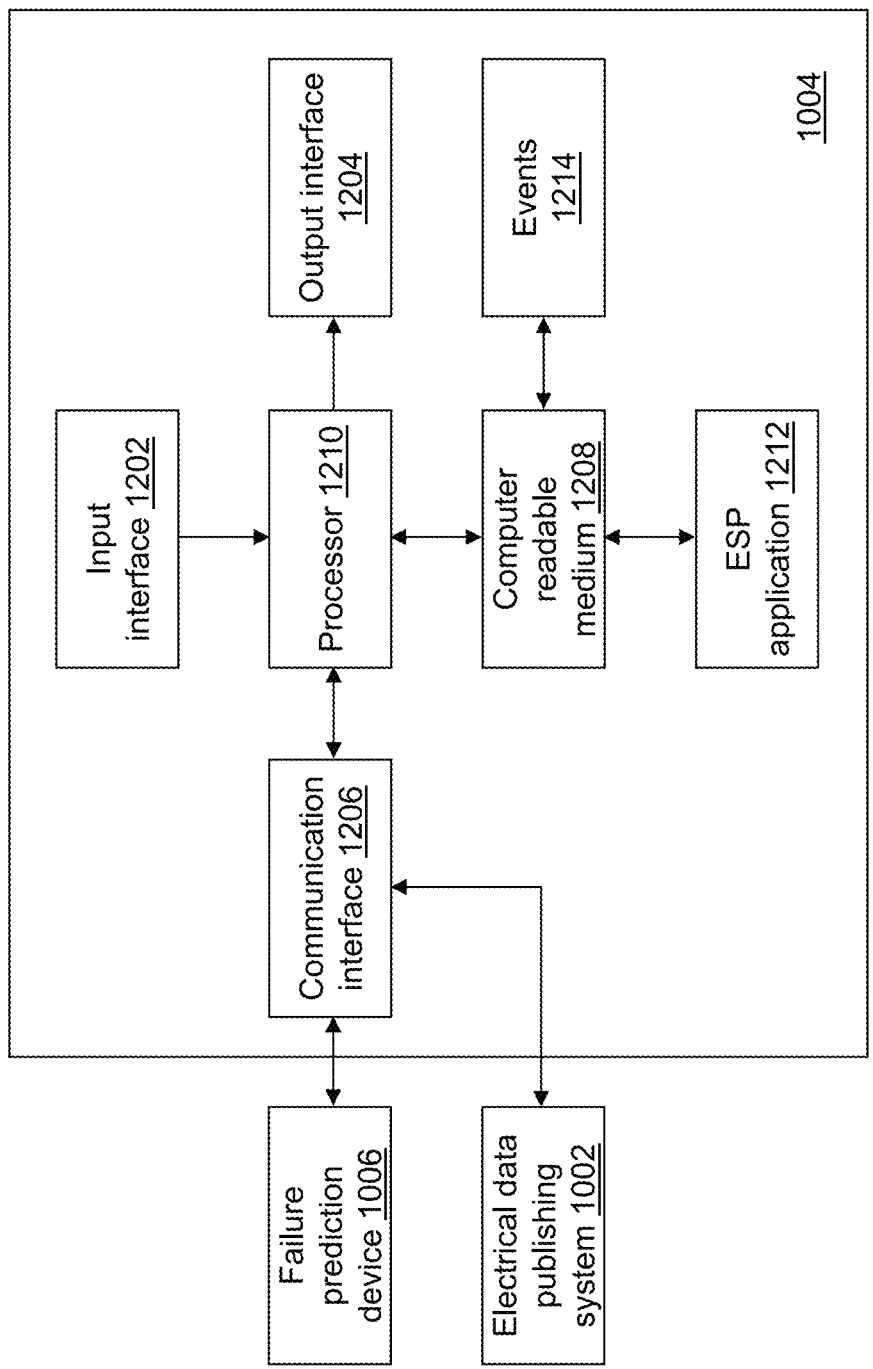
FIG. 12 depicts an event stream processing (ESP) device of the stream processing system of FIG. 10 in accordance with an illustrative embodiment.

Referring to FIG. 12, a block diagram of ESP device 1004 is shown in accordance with an illustrative embodiment. ESP device 1004 may include a third input interface 1202, a third output interface 1204, a third communication interface 1206, a third computer-readable medium 1208, a third processor 1210, an ESP application 1212, and events 1214. Fewer, different, or additional components may be incorporated into ESP device 1004.

Third input interface 1202 provides the same or similar functionality as that described with reference to input interface 102 of failure prediction device 100 though referring to ESP device 1004. Third output interface 1204 provides the same or similar functionality as that described with reference to output interface 104 of failure prediction device 100 though referring to ESP device 1004. Third communication interface 1206 provides the same or similar functionality as that described with reference to communication interface 106 of failure prediction device 100 though referring to ESP device 1004. Data and messages may be transferred between ESP device 1004 and electrical data publishing system 1002, second failure prediction device 1006, and/or status monitoring system 1008 using third communication interface 1206. Third computer-readable medium 1208 provides the same or similar functionality as that described with reference to computer-readable medium 108 of failure prediction device 100 though referring to ESP device 1004. Third processor 1210 provides the same or similar functionality as that described with reference to processor 110 of failure prediction device 100 though referring to ESP device 1004.

ESP device 1004 receives events 1214 that include measurement data received from electrical data publishing system 1002. Third computer-readable medium 1208 may provide the electronic storage medium for events 1214.

ESP application 1212 performs operations associated with coordinating and controlling the performance of analytics on events 1214 streamed from electrical data publishing system 1002 and with sending the processed event data to second failure prediction device 1006 and/or status monitoring system 1008 based on a subscription request. ESP application 1212 may embed an ESP engine (ESPE) with its own dedicated thread pool or pools into its application space where the main application thread can do application-specific work, and the ESPE processes event streams at least by creating an instance of a model into processing objects. The operations may be implemented using hardware, firmware, software, or any combination of these methods.

Referring to the example embodiment of FIG. 12, ESP application 1212 is implemented in software (comprised of computer-readable and/or computer-executable instructions) stored in third computer-readable medium 1208 and accessible by third processor 1210 for execution of the instructions that embody the operations of ESP application 1212. ESP application 1212 may be written using one or more programming languages, assembly languages, scripting languages, etc. ESP application 1212, for example, may be implemented as a Web application. For illustration, ESP application 1212 may be the SAS® Event Stream Processing Engine developed and provided by SAS Institute Inc. of Cary, N.C., USA.

Figure 13:
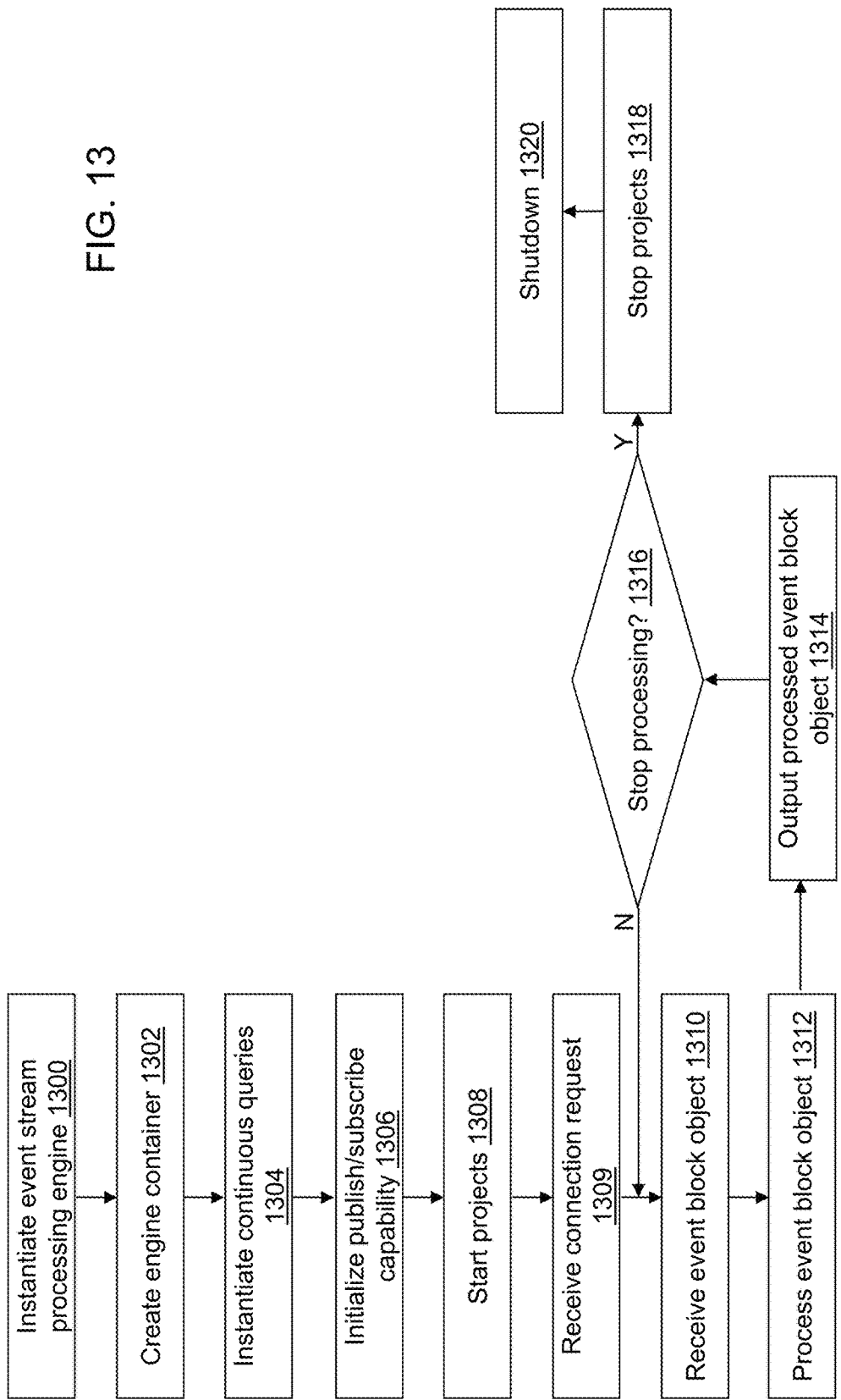
FIG. 13 depicts a flow diagram illustrating examples of operations performed by the ESP device of FIG. 12 in accordance with an illustrative embodiment.

Referring to FIG. 13, example operations associated with ESP application 1212 are described. ESP application 1212 defines how incoming event streams from electrical data publishing systems 1002 (events 1214) are transformed into meaningful outgoing event streams consumed by second failure prediction device 1006 and/or status monitoring system 1008. Additional, fewer, or different operations may be performed depending on the embodiment. The order of presentation of the operations of FIG. 13 is not intended to be limiting. A user can interact with one or more user interface windows presented to the user in a display under control of ESP application 1212 independently or through a browser application in an order selectable by the user. Although some of the operational flows are presented in sequence, the various operations may be performed in various repetitions, concurrently, and/or in other orders than those that are illustrated. For example, a user may execute ESP application 1212, which causes presentation of a first user interface window, which may include a plurality of menus and selectors such as drop down menus, buttons, text boxes, hyperlinks, etc. associated with ESP application 1212 as understood by a person of skill in the art. As further understood by a person of skill in the art, various operations may be performed in parallel, for example, using a plurality of threads.

Figure 14:
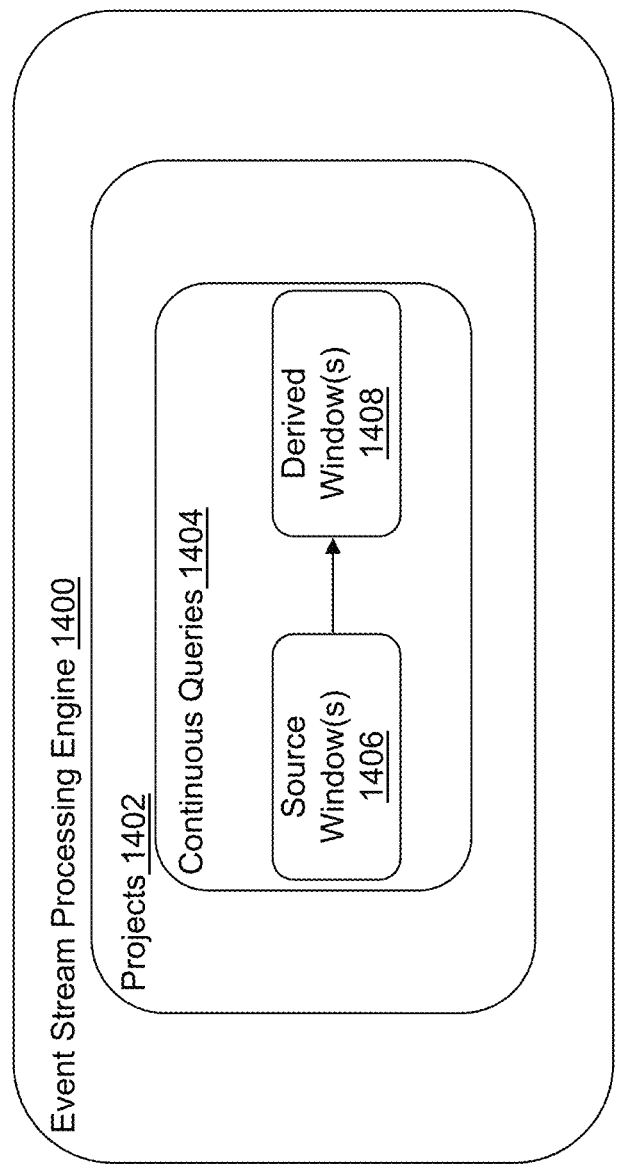
FIG. 14 depicts a block diagram of an ESP engine executing at the ESP device of FIG. 12 in accordance with an illustrative embodiment.

In an operation 300, ESP application 1212 defines and starts an ESPE thereby instantiating an ESPE at ESP device 1004. For example, referring to FIG. 14, the components of an ESPE 1400 executing at ESP device 1004 are shown in accordance with an illustrative embodiment. ESPE 1400 may include one or more projects 1402. A project may be described as a second-level container in an engine model managed by ESPE 1400 where a thread pool size for the project may be defined by a user. A value of one for the thread pool size indicates that writes are single-threaded. Each project of the one or more projects 1402 may include one or more continuous queries 1404 that contain data flows, which are data transformations of incoming event streams. The one or more continuous queries 1404 may include one or more source windows 1406 and one or more derived windows 1408.

The engine container is the top-level container in a model that manages the resources of the one or more projects 1402. In an illustrative embodiment, for example, there is a single ESPE 1400 for each instance of ESP application 1212, and ESPE 1400 has a unique engine name. Additionally, the one or more projects 1402 may each have unique project names, and each query may have a unique continuous query name and begin with a uniquely named source window of the one or more source windows 1406. ESPE 1400 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 1406 and the one or more derived windows 1408 represent continuously executing queries that generate updates to a query result set as new event blocks stream through ESPE 1400. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary ID for the event so ESPE 1400 can support operation codes (opcodes) for events including insert, update, upsert, and delete. Upsert opcodes update the event if the key field already exists; otherwise, the event is inserted. For illustration, an event object may be a packed binary representation of one or more sensor measurements and may include both metadata and measurement data associated with a timestamp value. The metadata may include an opcode indicating if the event represents an insert, update, delete, or upsert, a set of flags indicating if the event is a normal, partial-update, or a retention generated event from retention policy management, and a set of microsecond timestamps. For example, the set of microsecond timestamps may indicate a sensor data generation time, a data receipt time by first publishing device 112-1, a data transmit time by first publishing device 112-1, a data receipt time by ESP device 1004, etc.

An event block object may be described as a grouping or package of one or more event objects. An event stream may be described as a flow of event block objects. A continuous query of the one or more continuous queries 1404 transforms the incoming event stream made up of streaming event block objects published into ESPE 1400 into one or more outgoing event streams using the one or more source windows 1406 and the one or more derived windows 1408. A continuous query can also be thought of as data flow modeling.

The one or more source windows 1406 are at the top of the directed graph and have no windows feeding into them. Event streams are published into the one or more source windows 1406, and from there, the event streams are directed to the next set of connected windows as defined by the directed graph. The one or more derived windows 1408 are all instantiated windows that are not source windows and that have other windows streaming events into them. The one or more derived windows 1408 perform computations or transformations on the incoming event streams. The one or more derived windows 1408 transform event streams based on the window type (that is operators such as join, filter, compute, aggregate, copy, pattern match, procedural, union, etc.) and window settings. As event streams are published into ESPE 1400, they are continuously queried, and the resulting sets of derived windows in these queries are continuously updated.

ESP application 1212 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 1212 to embed ESPE 1400 possibly with dedicated thread pools into its own process space. Alternatively, ESPE 1400 can be embedded into the process space of an existing or a new application. In that case, a main application thread is focused on its own chores and interacts with the embedded ESPE 1400 as needed.

Referring to FIG. 13, in an operation 1302, the engine container is created. For illustration, ESPE 1400 may be instantiated using a function call that specifies the engine container as a manager for the model. The function call may include the engine name for ESPE 1400 that is provided by a user or a developer and may be unique to ESPE 1400.

In an operation 1304, the one or more continuous queries 1404 are instantiated by ESPE 1400 as a model. The one or more continuous queries 1404 may be instantiated with a dedicated thread pool or pools that generate updates as new event block objects stream through ESPE 1400. For illustration, the one or more continuous queries 1404 may be created to validate, transform, and/or supplement the sensor measurement values received from electrical data publishing system 1002. For further illustration, the one or more continuous queries 1404 may be created to score the validated, transformed, and/or supplemented sensor measurement values through instantiation of probability of failure model 130.

To create a continuous query, input event structures that are schemas with keys that flow into the one or more source windows 1406 may be identified. Output event structures that are also schemas with keys generated by the one or more source windows 1406 and/or the one or more derived windows 1408 may also be identified. For example, the block of code below illustrates creation of a compute window that normalizes a "City" field that is created for events in that window:

```
dfESPwindow_source *sw;
sw = contQuery->newWindow_source("sourceWindow", depot,
    dfESPindextypes::pi_HASH,
    dfESPstring("name:string,ID*:int32,city:string"));
dfESPschema *sw_schema = sw->getSchema( );
dfESPwindow_compute *cw;
cw = contQuery->newWindow_compute("computeWindow", depot,
    dfESPindextypes::pi_HASH,
    dfESPstring
    ("ID*:int32,name:string,oldCity:string,newCity:string"));
// Register the non-key field calculation expressions.
    cw->addNonKeyFieldCalc("name"); // pass name through unchanged
    cw->addNonKeyFieldCalc("city"); // pass city through unchanged
// Run city through the blue fusion standardize function.
    char newCity[1024] = "bluefusion bf\r\n";
    strcat(newCity, "String result\r\n");
    strcat(newCity, "bf = bluefusion_initialize( )\r\n");
    strcat(newCity, "if (isnull(bf)) then\r\n");
    strcat(newCity, " print(bf.getlasterror( ))\r\n");
    strcat(newCity, "if (bf.loadqkb(\"ENUSA\") == 0) then\r\n");
    strcat(newCity, " print(bf.getlasterror( ))\r\n");
    strcat(newCity, "if
    (bf.standardize(\"City\",city,result) == 0) then\r\n");
    strcat(newCity, " print(bf.getlasterror( ))\r\n");
    strcat(newCity, "return result");
    cw->addNonKeyFieldCalc(newCity);
// Add the subscriber callbacks to the windows
    cw->addSubscriberCallback(winSubscribe_compute);
// Add window connectivity
    contQuery->addEdge(sw, 0, cw);
// create and start the project
    project->setNumThreads(2);
    myEngine->startProjects( );
// declare variables to build up the input data.
    dfESPptrVect<dfESPeventPtr> trans;
    dfESPevent *p;
// Insert multiple events
    p = new dfESPevent(sw_schema,(char *)"i,n,Jerry, 1111, apex");
    trans.push_back(p);
    p = new dfESPevent(sw_schema,(char *)"i,n,Scott, 1112, caryy");
    trans.push_back(p);
    p = new dfESPevent(sw_schema,(char *)"i,n,someone, 1113,
    rallleigh"); trans.push_back(p);
    dfESPeventblockPtr ib = dfESPeventblock::newEventBlock(&trans,
        dfESPeventblock::ebt_TRANS);
    project->injectData(contQuery, sw, ib);
```

ESPE 1400 may analyze and process events in motion or event streams. Instead of storing events 1214 and running queries against the stored events 1214, ESPE 1400 may store queries and stream events 1214 through them to allow continuous analysis of data as it is received. The one or more source windows 1406 and the one or more derived windows 1408 may be created based on the relational, pattern matching, and procedural algorithms that transform the input event streams into the output event streams to model, simulate, score, test, predict, etc. based on the continuous query model defined and application to the streamed data.

In an operation 1306, a publish/subscribe (pub/sub) capability is initialized for ESPE 1400. In an illustrative embodiment, a pub/sub capability is initialized for each project of the one or more projects 1402. To initialize and enable pub/sub capability for ESPE 1400, a port number is provided. Pub/sub clients can use a host name of ESP device 1004 and the port number to establish pub/sub connections to ESPE 1400. For example, a server listener socket is opened for the port number to enable electrical data publishing system 1002, second failure prediction device 1006, and/or status monitoring system 1008 to connect to ESPE 1400 for publish/subscribe services. The host name of ESP device 1004 and the port number to establish pub/sub connections to ESPE 1400 may be referred to as the host: port designation of ESPE 1400 executing at ESP device 1004.

Publish-subscribe is a message-oriented interaction paradigm based on indirect addressing. Processed data recipients (second failure prediction device 1006 and/or status monitoring system 1008) specify their interest in receiving information from ESPE 1400 by subscribing to specific classes of events, while information sources (electrical data publishing system 1002) publish events to ESPE 1400 without directly addressing the data recipients. ESPE 1400 coordinates the interactions and processes events 1214. In some cases, the data source receives confirmation that the published information has been received by a data recipient.

A publish/subscribe API may be described as a library that enables an event publisher, such as first publishing device 112-1, to publish event streams into ESPE 1400 or an event subscriber to subscribe to event streams from ESPE 1400. For illustration, one or more publish/subscribe APIs may be defined. As an example, a version of the SAS® ESP Engine provided by SAS Institute Inc. can provide a C++ publish/subscribe API and a Java publish/subscribe API. Using the publish/subscribe API, electrical data publishing application 1116 may publish event streams into a running event stream processor project source window of ESPE 1400, and a subscribing device of the status monitoring system 1008 may subscribe to a project source window of ESPE 1400. The publish/subscribe API provides cross-platform connectivity and endianness compatibility between ESP application 1212 and other networked applications.

Referring again to FIG. 13, operation 1306 initializes the publish/subscribe capability of ESPE 1400. In an operation 1308, the one or more projects 1402 are started. The one or more started projects may run in the background on ESP device 1004. In an operation 1309, a connection request is received from a computing device of electrical data publishing systems 102, for example, from first publishing device 112-1, for a source window to which data will be published.

In an operation 1310, an event block object is received from one or more computing devices of electrical data publishing systems 102, for example, from first publishing device 112-1. An event block object containing one or more event objects is injected into a source window of the one or more source windows 1406 from an instance of electrical data publishing application 1116. The unique ID assigned to the event block object by first publishing device 112-1 is maintained as the event block object is passed between the one or more source windows 1406 and/or the one or more derived windows 1408 of ESPE 1400. A unique embedded transaction ID further may be embedded in the event block object as the event block object is processed by a continuous query. The received event block objects may be stored as events 1214, for example, in a RAM or cache type of third computer-readable medium 1208.

In an operation 1312, the event block object is processed through the one or more continuous queries 1404. For example, processing details are described above referring, for example, to operations 228, 230, 232, and/or 234 of FIG. 2A. In an operation 1314, the processed event block object is output to one or more subscribing device of second failure prediction device 1006 and/or status monitoring system 1008.

ESPE 1400 maintains the event block containership aspect of the received event blocks from when the event block is published into a source window and works its way through the directed graph defined by the one or more continuous queries 1404 with the various event translations before being output to subscribing devices. Subscribing devices can correlate a group of subscribed event block objects back to a group of published event block objects by comparing the unique ID of the event block object that a publisher, such as first publishing device 112-1, attached to the event block object with the event block ID received by the subscribing device.

In an operation 1316, a determination is made concerning whether or not processing is stopped. If processing is not stopped, processing continues in operation 1310 to continue receiving the one or more event streams containing event block objects from the one or more devices of electrical data publishing system 1002. If processing is stopped, processing continues in an operation 1318. In operation 1318, the started projects are stopped. In operation 1320, ESPE 1400 is shutdown.

Figure 15:
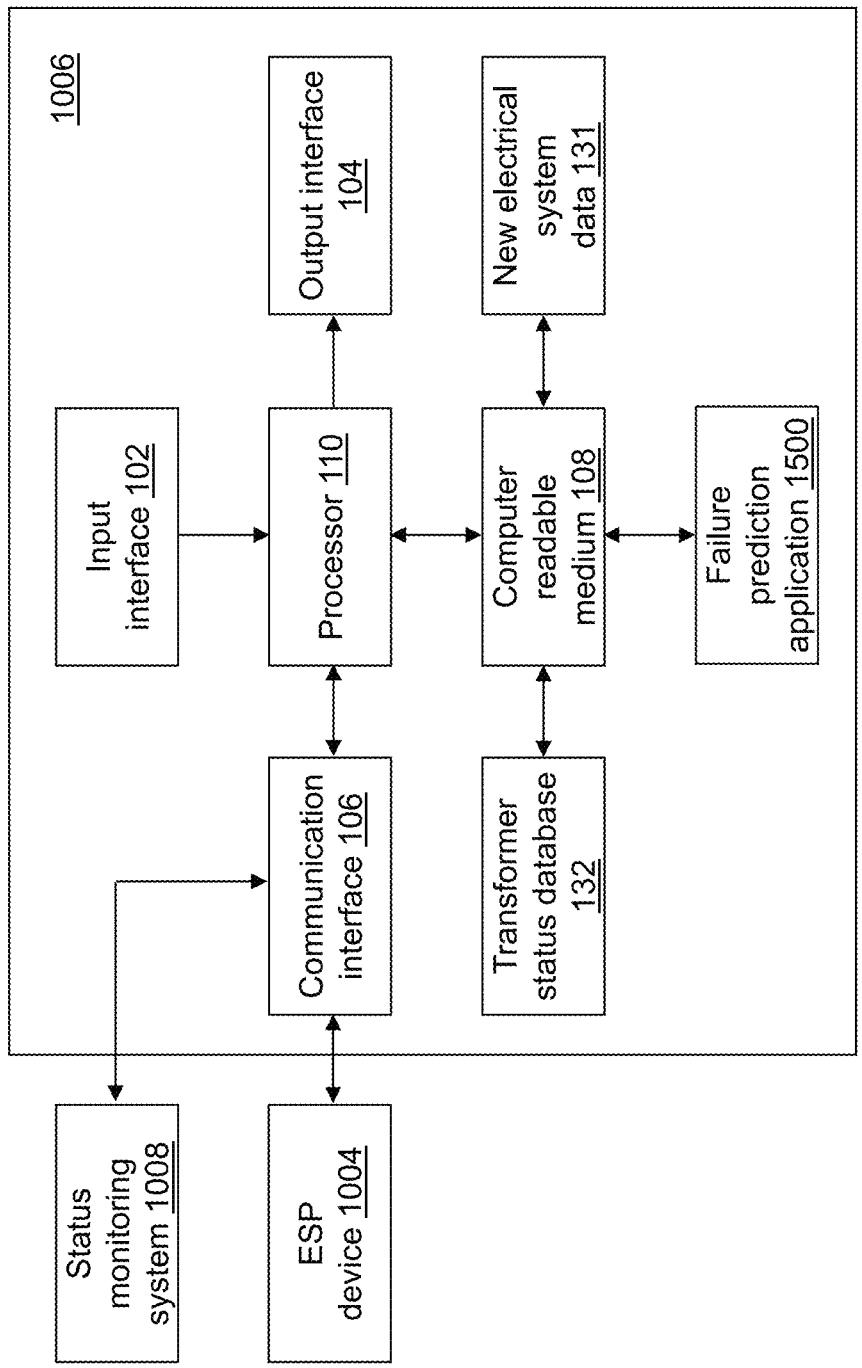
FIG. 15 depicts a second failure prediction device of the stream processing system of FIG. 10 in accordance with an illustrative embodiment.

Referring to FIG. 15, a block diagram of a second failure prediction device 1006 is shown in accordance with an example embodiment. Second failure prediction device 1006 may be similar to failure prediction device 100 except that second failure prediction device may not be used to define probability of failure model 130. Instead, a different computing device may define probability of failure model 130, for example, by performing operations 200 to 226 and operations 234 to 290. Data and messages may be transferred between second failure prediction device 1006 and ESP device 1004 and/or status monitoring system 1008 using communication interface 106.

Second failure prediction device 1006 may include a failure prediction application 1500. Failure prediction application 1500 instantiates probability of failure model 130 determined from the operations of FIGS. 2A, 2B, 2C, and 2D performed previously. Failure prediction application 1500 performs operations associated with receiving events from ESP device 1004 and computing a probability of failure for one or more transformers based on new electrical system data 131 included in the received events 414 and instantiation of probability of failure model 130. Failure prediction application 1500 may update transformer status database 132. The operations may be implemented using hardware, firmware, software, or any combination of these methods. Referring to the example embodiment of FIG. 15, failure prediction application 1500 is implemented in software (comprised of computer-readable and/or computer-executable instructions) stored in computer-readable medium 108 and accessible by processor 110 for execution of the instructions that embody the operations of failure prediction application 1500. Failure prediction application 1500 may be written using one or more programming languages, assembly languages, scripting languages, etc. Failure prediction application 1500 may be implemented as a Web application.

Figure 16:
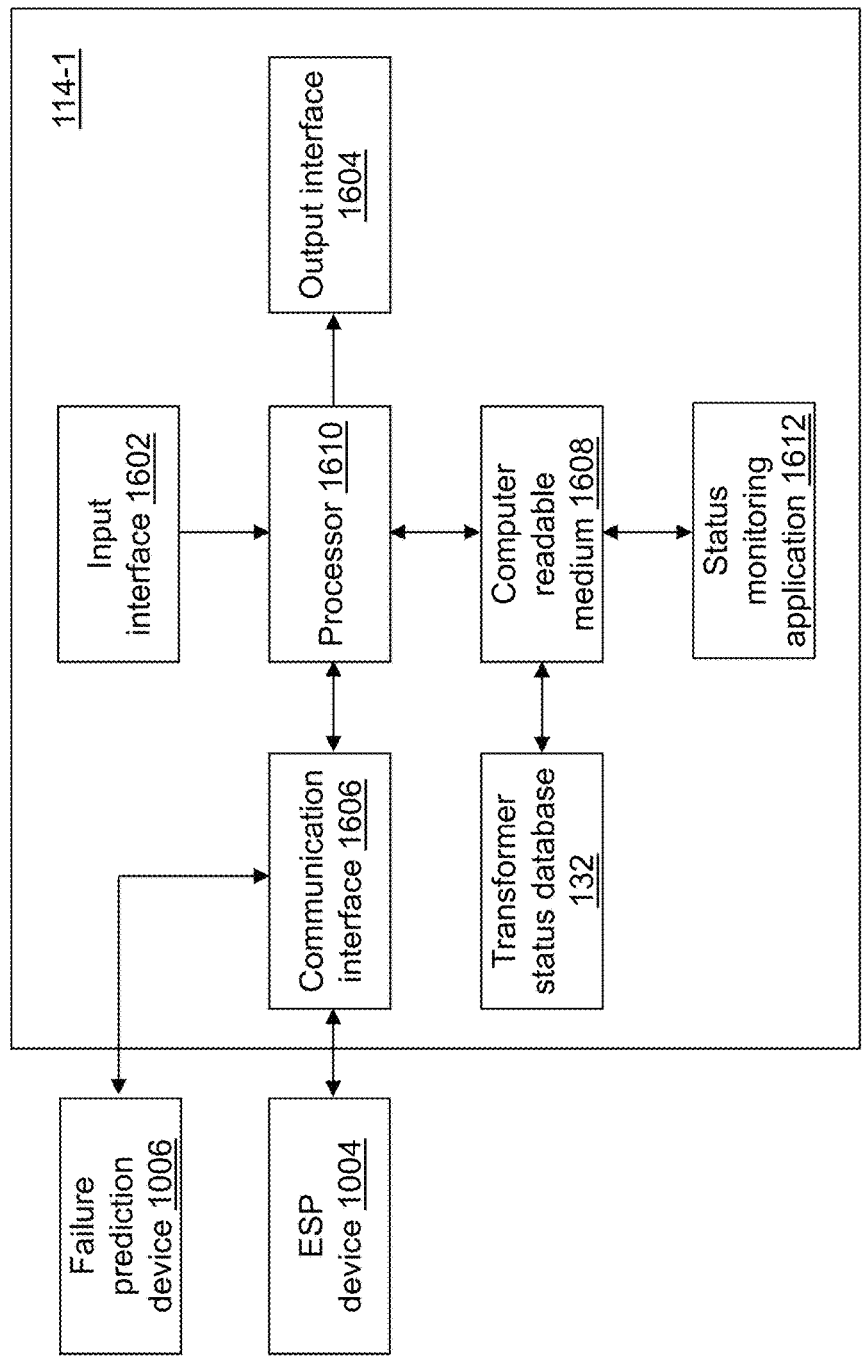
FIG. 16 depicts a status monitoring device of the stream processing system of FIG. 10 in accordance with an illustrative embodiment.

Referring to FIG. 16, a block diagram of first status monitoring device 114-1 is shown in accordance with an example embodiment. First status monitoring device 114-1 is an example computing device of status monitoring system 1008. For example, each of first status monitoring device 114-1, second status monitoring device 114-2, third status monitoring device 114-3, and $n^{th}$ status monitoring device 114-N is an instance of a status monitoring device.

First status monitoring device 114-1 may include a fourth input interface 1602, a fourth output interface 1604, a fourth communication interface 1606, a fourth computer-readable medium 1608, a fourth processor 1610, a status monitoring application 1612, and transformer status database 132. Fewer, different, and additional components may be incorporated into first status monitoring device 114-1. The devices of status monitoring system 1008 may be geographically dispersed from each other and/or co-located. Each status monitoring device of status monitoring system 1008 may include the same or different components or combination of components.

Fourth input interface 1602 provides the same or similar functionality as that described with reference to input interface 102 of failure prediction device 100 though referring to first status monitoring device 114-1. Fourth output interface 1604 provides the same or similar functionality as that described with reference to output interface 104 of failure prediction device 100 though referring to first status monitoring device 114-1. Fourth communication interface 1606 provides the same or similar functionality as that described with reference to communication interface 106 of failure prediction device 100 though referring to first status monitoring device 114-1. Data and messages may be transferred between first status monitoring device 114-1 and ESP device 1004 and/or second failure prediction device 1006 using fourth communication interface 1606. Fourth computer-readable medium 1608 provides the same or similar functionality as that described with reference to computer-readable medium 108 of failure prediction device 100 though referring to first status monitoring device 114-1. Fourth processor 1610 provides the same or similar functionality as that described with reference to processor 110 of failure prediction device 100 though referring to first status monitoring device 114-1.

Status monitoring application 1612 performs operations associated with outputting data from transformer status database 132. The operations may be implemented using hardware, firmware, software, or any combination of these methods. Referring to the example embodiment of FIG. 16, status monitoring application 1612 is implemented in software (comprised of computer-readable and/or computer-executable instructions) stored in fourth computer-readable medium 1608 and accessible by fourth processor 1610 for execution of the instructions that embody the operations of status monitoring application 1612. Status monitoring application 1612 may be written using one or more programming languages, assembly languages, scripting languages, etc. Status monitoring application 1612 may be implemented as a Web application.

Referring to FIG. 17, example operations associated with electrical data publishing application 1116 are described. Additional, fewer, or different operations may be performed depending on the embodiment. The order of presentation of the operations of FIG. 17 is not intended to be limiting.

In an operation 1700, ESPE 1400 is queried, for example, to discover projects 1402, continuous queries 1404, windows 1406, 1408, window schema, and window edges currently running in ESPE 1400. The engine name and host/port to ESPE 1400 may be provided as an input to the query and a list of strings may be returned with the names to the projects 1402, to the continuous queries 1404, to the windows 1406, 1408, to the window schema, and/or to the window edges of currently running projects on ESPE 1400. The host is associated with a host name or Internet Protocol (IP) address of ESP device 1004. The port is the port number provided when the pub/sub capability is initialized by ESPE 1400. The engine name is the name of ESPE 1400. The engine name of ESPE 1400 and host/port to ESP device 1004 may be read from a storage location on second computer-readable medium 1108, may be provided on a command line, or otherwise input to or defined by electrical data publishing application 1116 as understood by a person of skill in the art.

In an operation 1702, publishing services are initialized. In an operation 1704, the initialized publishing services are started, which may create a publishing client for the instantiated electrical data publishing application 1116. The publishing client performs the various pub/sub activities for the instantiated electrical data publishing application 1116. For example, a string representation of a URL to ESPE 1400 is passed to a "Start" function. For example, the URL may include the host:port designation of ESPE 1400 executing at ESP device 1004, a project of the projects 1402, a continuous query of the continuous queries 1404, and a window of the source windows 1406. The "Start" function may validate and retain the connection parameters for a specific publishing client connection and return a pointer to the publishing client. For illustration, the URL may be formatted as "dfESP://<host>:<port>/<project name>/<continuous query name>/<window name>". If electrical data publishing application 1116 is publishing to more than one source window of ESPE 1400, the initialized publishing services may be started to each source window using the associated names (project name, continuous query name, window name).

In an operation 1706, a connection is made between electrical data publishing application 1116 and ESPE 1400 for each source window to which data is published. To make the connection, the pointer to the created publishing client may be passed to a "Connect" function. If electrical data publishing application 1116 is publishing to more than one source window of ESPE 1400, a connection may be made to each started window using the pointer returned for the respective "Start" function call.

In an operation 1707, a measurement data value is received from sensor 1112, for example, through second communication interface 1106 or second input interface 1102. In an operation 1708, an event block object is created by electrical data publishing application 1116 that includes the received measurement data value and a time value associated with a time the measurement data value was generated by sensor 1112. The measurement data value may be processed before inclusion in the event block object, for example, to change a unit of measure, convert to a different reference system, etc. The event block object may include a plurality of measurement data values measured at different times and/or by different sensors.

In an operation 1710, the created event block object is published to ESPE 1400 using the pointer returned for the respective "Start" function call to the appropriate source window. Electrical data publishing application 1116 passes the created event block object to the created publishing client, where the unique ID field in the event block object has been set by electrical data publishing application 1116 possibly after being requested from the created publishing client. In an illustrative embodiment, electrical data publishing application 1116 may wait to begin publishing until a "Ready" callback has been received from the created publishing client. The event block object is injected into the source window, continuous query, and project associated with the started publishing client.

In an operation 1712, a determination is made concerning whether or not processing is stopped. If processing is not stopped, processing continues in operation 1707 to continue receiving measurement data from one or more sensors and creating and publishing event block objects that include the measurement data. If processing is stopped, processing continues in an operation 1714. In operation 1714, the connection made between electrical data publishing application 1116 and ESPE 1400 through the created publishing client is disconnected, and each started publishing client is stopped.

Figure 18:
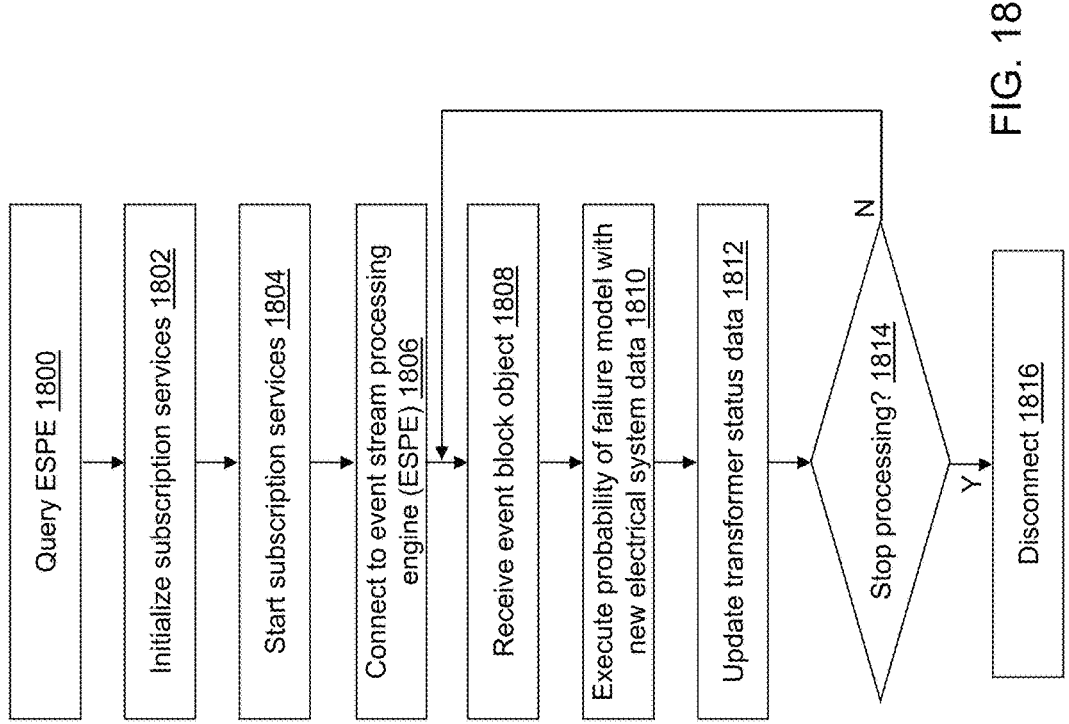
FIG. 18 depicts a flow diagram illustrating examples of operations performed by the second failure prediction device of FIG. 15 in accordance with an illustrative embodiment.

Referring to FIG. 18, example operations associated with failure prediction application 1500 are described. Additional, fewer, or different operations may be performed depending on the embodiment. The order of presentation of the operations of FIG. 18 is not intended to be limiting.

Similar to operation 1700, in an operation 1800, ESPE 1400 is queried, for example, to discover names of projects 1402, of continuous queries 1404, of windows 1406, 1408, of window schema, and of window edges currently running in ESPE 1400. The host name of ESP device 1004, the engine name of ESPE 1400, and the port number opened by ESPE 1400 are provided as an input to the query and a list of strings may be returned with the names to the projects 1402, continuous queries 1404, windows 1406, 408, window schema, and/or window edges.

In an operation 1802, subscription services are initialized. In an operation 1804, the initialized subscription services are started, which may create a subscribing client on behalf of failure prediction application 1500 at second failure prediction device 1006. The subscribing client performs the various pub/sub activities for failure prediction application 1500. For example, a URL to ESPE 1400 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1806, a connection is made between failure prediction application 1500 and ESPE 1400 through the created subscribing client. To make the connection, the pointer to the created subscribing client may be passed to a "Connect" function and a mostly non-busy wait loop created to wait for receipt of event block objects.

In an operation 1808, an event block object is received by failure prediction application 1500. In an operation 1810, the received event block object is processed based on the operational functionality provided by failure prediction application 1500. For example, failure prediction application 1500 may extract sensor measurement data from the received event block object and store the extracted sensor measurement data in historical electrical system data 122. In addition, failure prediction application 1500 may perform one or more of operations 228, 230, 232, and/or 234 of FIG. 2A. Failure prediction application 1500 further may send the resulting data to status monitoring system 1008.

In an operation 1812, transformer status database 132 may be updated with new failure prediction values for one or more transformers.

In an operation 1814, a determination is made concerning whether or not processing is stopped. If processing is not stopped, processing continues in operation 1808 to continue receiving event block objects. If processing is stopped, processing continues in an operation 1816. In operation 1816, the connection made between failure prediction application 1500 and ESPE 1400 through the subscribing client is disconnected, and the subscribing client is stopped.

Figure 19:
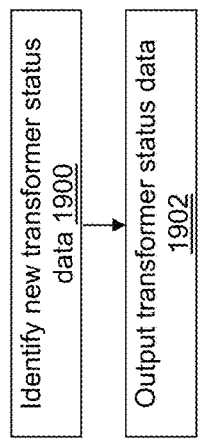
FIG. 19 depicts a flow diagram illustrating examples of operations performed by the status monitoring device of FIG. 16 in accordance with an illustrative embodiment.

Referring to FIG. 19, example operations associated with status monitoring application 1612 are described. Additional, fewer, or different operations may be performed depending on the embodiment. The order of presentation of the operations of FIG. 19 is not intended to be limiting.

In an operation 1900, new transformer status data is identified. For example, new transformer status data may be received from second failure prediction device 1006. As another option, new transformer data may be identified by monitoring updates to transformer status database 132.

In an operation 1902, the identified new transformer status data is output. For example, statistical results may be stored on one or more devices and/or on fourth computer-readable medium 1608 in a variety of formats as understood by a person of skill in the art. The statistical results further may be output to a display, a printer, a speaker, another computing device, etc. as described with reference to failure prediction device 100. In an illustrative embodiment, an alert message may be sent to another device using fourth communication interface 1606, printed on the printer, presented visually on the display, presented audibly using the speaker when a failure is predicted above a predefined threshold. Status monitoring application 1612 further may send the identified new transformer status data to the system control operator display system, the failure notification device, and/or the post-failure analysis device to respond as needed to the failure. Illustrative displays are presented in FIGS. 3 through 9.

Stream processing system 1000 and/or failure prediction device 100 identify factors critical to identify transformer overloads, improve methods to anticipate transformer failures, enhance regular equipment maintenance schedules, and/or reduce unscheduled maintenance except during unplanned incidents like storms.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
receive historical electrical system data that includes a plurality of observations with a plurality of data points defined for each observation, wherein each data point of the plurality of data points is associated with a variable to define a plurality of variables;
partition the received historical electrical system data into a training dataset and a validation dataset, wherein the validation dataset is different from the training dataset;
receive an analysis type indicator defined by a user;
compute a worth value for each of the plurality of variables;
select highest worth variables from the plurality of variables based on the computed worth values, wherein a number of variables of the highest worth variables is greater than 200 based on the received analysis type indicator;

select a first model based on the received analysis type indicator;

train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator, wherein the selected first model is a decision tree model and the selected second model is a neural network model;

train the selected second model using values from the training dataset of the selected highest worth variables to predict the probability of failure of the plurality of electrical transformers;

validate the trained second model using the validation dataset to statistically assess the fit by the trained second model to the historical electrical system data;

compare the fit by the trained first model to the fit by the trained second model;

select a probability of failure model as the validated first model or the validated second model based on the comparison;

receive electrical system data for a transformer;

execute the selected probability of failure model with the received electrical system data to compute a probability of failure of the transformer; and update a failure probability for the transformer based on the computed probability of failure.

2. A non-transitory computer-readable medium having stored thereon computer-readable instructions that when executed by a computing device cause the computing device to:

receive historical electrical system data that includes a plurality of observations with a plurality of data points defined for each observation, wherein each data point of the plurality of data points is associated with a variable to define a plurality of variables;

partition the received historical electrical system data into a training dataset and a validation dataset, wherein the validation dataset is different from the training dataset;

receive an analysis type indicator defined by a user;

compute a worth value for each of the plurality of variables;

select highest worth variables from the plurality of variables based on the computed worth values, wherein a number of variables of the highest worth variables is limited to a predetermined number based on the received analysis type indicator;

select a first model based on the received analysis type indicator;

train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator;

train the selected second model using values from the training dataset of the selected highest worth variables to predict the probability of failure of the plurality of electrical transformers;

validate the trained second model using the validation dataset to statistically assess the fit by the trained second model to the historical electrical system data;

compare the fit by the trained first model to the fit by the trained second model;

select a third model based on the received analysis type indicator, wherein the selected first model is a decision tree model, the selected second model is a neural network model, and the selected third model is a backward regression model;

train the selected third model using values from the training dataset of the selected highest worth variables to predict the probability of failure of the plurality of electrical transformers;

validate the trained third model using the validation dataset to statistically assess the fit by the trained third model to the historical electrical system data;

compare the fit by the trained third model to the fit by the trained second model and the fit by the trained first model;

select a probability of failure model as the validated first model, the validated second model, or the validated third model based on the comparisons;

receive electrical system data for a transformer;

execute the selected probability of failure model with the received electrical system data to compute a probability of failure of the transformer; and update a failure probability for the transformer based on the computed probability of failure.

3. The non-transitory computer-readable medium of claim 2, wherein the predetermined number is greater than 200.

4. A non-transitory computer-readable medium having stored thereon computer-readable instructions that when executed by a computing device cause the computing device to:

receive historical electrical system data that includes a plurality of observations with a plurality of data points defined for each observation, wherein each data point of the plurality of data points is associated with a variable to define a plurality of variables;

partition the received historical electrical system data into a training dataset and a validation dataset, wherein the validation dataset is different from the training dataset;

receive an analysis type indicator defined by a user;

compute a worth value for each of the plurality of variables;

select highest worth variables from the plurality of variables based on the computed worth values, wherein a number of variables of the highest worth variables is limited to a predetermined number based on the received analysis type indicator;

select a first model based on the received analysis type indicator;

train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator;

train the selected second model using values from the training dataset of the selected highest worth variables to predict the probability of failure of the plurality of electrical transformers;
validate the trained second model using the validation dataset to statistically assess the fit by the trained second model to the historical electrical system data;
compare the fit by the trained first model to the fit by the trained second model;
select a third model based on the received analysis type indicator;
train the selected third model using values from the training dataset of the selected highest worth variables to predict the probability of failure of the plurality of electrical transformers;
validate the trained third model using the validation dataset to statistically assess the fit by the trained third model to the historical electrical system data;
compare the fit by the trained third model to the fit by the trained second model and the fit by the trained first model;
create a fourth model as an ensemble model based on the received analysis type indicator using the trained third model, the trained second model, and the trained first model;
train the created fourth model using values from the training dataset of the selected highest worth variables to predict the probability of failure of the plurality of electrical transformers;
validate the trained fourth model using the validation dataset to statistically assess the fit by the trained fourth model to the historical electrical system data;
select a probability of failure model as the validated first model, the validated second model, or the validated third model based on the comparisons;
compare the fit by the trained fourth model to the fit by the selected probability of failure model;
update the probability of failure model selection as the validated fourth model or the selected probability of failure model based on the comparison between the trained fourth model and the selected probability of failure model;
receive electrical system data for a transformer;
execute the selected probability of failure model with the received electrical system data to compute a probability of failure of the transformer; and
update a failure probability for the transformer based on the computed probability of failure.

5. The non-transitory computer-readable medium of claim 4, wherein the selected first model is a decision tree model, the selected second model is a neural network model, and the selected third model is a backward regression model.

6. A non-transitory computer-readable medium having stored thereon computer-readable instructions that when executed by a computing device cause the computing device to:
receive historical electrical system data that includes a plurality of observations with a plurality of data points defined for each observation, wherein each data point of the plurality of data points is associated with a variable to define a plurality of variables;
partition the received historical electrical system data into a training dataset and a validation dataset, wherein the validation dataset is different from the training dataset;
receive an analysis type indicator defined by a user;
compute a worth value for each of the plurality of variables;
select highest worth variables from the plurality of variables based on the computed worth values, wherein a number of variables of the highest worth variables is limited to a predetermined number based on the received analysis type indicator;
select a first model based on the received analysis type indicator;
train the selected first model using values from the training dataset of the selected highest worth variables to predict a probability of failure of a plurality of electrical transformers;
validate the trained first model using the validation dataset to statistically assess a fit by the trained first model to the historical electrical system data;
select a second model based on the received analysis type indicator, wherein the selected first model is a decision tree model and the selected second model is a stepwise regression model;
train the selected second model using values from the training dataset of the selected highest worth variables to predict the probability of failure of the plurality of electrical transformers;
validate the trained second model using the validation dataset to statistically assess the fit by the trained second model to the historical electrical system data;
compare the fit by the trained first model to the fit by the trained second model;
select a probability of failure model as the validated first model or the validated second model based on the comparison;
receive electrical system data for a transformer;
execute the selected probability of failure model with the received electrical system data to compute a probability of failure of the transformer; and
update a failure probability for the transformer based on the computed probability of failure.

7. The non-transitory computer-readable medium of claim 6, wherein the predetermined number is less than 200 and greater than 100.

8. A non-transitory computer-readable medium having stored thereon computer-readable instructions that when executed by a computing device cause the computing device to:
receive historical electrical system data that includes a plurality of observations with a plurality of data points defined for each observation, wherein each data point of the plurality of data points is associated with a variable to define a plurality of variables;
partition the received historical electrical system data into a training dataset and a validation dataset, wherein the validation dataset is different from the training dataset;
receive an analysis type indicator defined by a user;
compute a worth value for each of the plurality of variables;
select highest worth variables from the plurality of variables based on the computed worth values, wherein a number of variables of the highest worth variables is limited to a predetermined number based on the received analysis type indicator;
select a first model based on the received analysis type indicator;
train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator;

train the selected second model using values from the training dataset of the selected highest worth variables to predict the probability of failure of the plurality of electrical transformers;

validate the trained second model using the validation dataset to statistically assess the fit by the trained second model to the historical electrical system data;

compare the fit by the trained first model to the fit by the trained second model;

select a third model based on the received analysis type indicator, wherein the selected first model is a decision tree model, the selected second model is a backward regression model, and the selected third model is a logistic regression model;

train the selected third model using values from the training dataset of the selected highest worth variables to predict the probability of failure of the plurality of electrical transformers;

validate the trained third model using the validation dataset to statistically assess the fit by the trained third model to the historical electrical system data;

compare the fit by the trained third model to the fit by the trained second model and the fit by the trained first model;

select a probability of failure model as the validated first model, the validated second model, or the validated third model based on the comparisons;

receive electrical system data for a transformer;

execute the selected probability of failure model with the received electrical system data to compute a probability of failure of the transformer; and update a failure probability for the transformer based on the computed probability of failure.

9. The non-transitory computer-readable medium of claim 8, wherein the predetermined number is less than 200 and greater than 100.

10. A non-transitory computer-readable medium having stored thereon computer-readable instructions that when executed by a computing device cause the computing device to:

receive historical electrical system data that includes a plurality of observations with a plurality of data points defined for each observation, wherein each data point of the plurality of data points is associated with a variable to define a plurality of variables;

partition the received historical electrical system data into a training dataset and a validation dataset, wherein the validation dataset is different from the training dataset;

receive an analysis type indicator defined by a user;

compute a worth value for each of the plurality of variables;

select highest worth variables from the plurality of variables based on the computed worth values, wherein a number of variables of the highest worth variables is limited to a predetermined number based on the received analysis type indicator;

select a first model based on the received analysis type indicator;

train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator;

train the selected second model using values from the training dataset of the selected highest worth variables to predict the probability of failure of the plurality of electrical transformers;

validate the trained second model using the validation dataset to statistically assess the fit by the trained second model to the historical electrical system data;

compare the fit by the trained first model to the fit by the trained second model;

select a probability of failure model as the validated first model or the validated second model based on the comparison;

select second highest worth variables from the plurality of variables based on the computed worth values, wherein a number of variables of the second highest worth variables is limited to a second predetermined number based on the received analysis type indicator;

select a third model based on the received analysis type indicator;

train the selected third model using values from the training dataset of the selected second highest worth variables to predict the probability of failure of the plurality of electrical transformers;

validate the trained third model using the validation dataset to statistically assess the fit by the trained third model to the historical electrical system data;

compare the fit by the trained third model to the fit by the selected probability of failure model;

update the probability of failure model selection as the validated third model or the selected probability of failure model based on the comparison between the trained third model and the selected probability of failure model;

receive electrical system data for a transformer;

execute the selected probability of failure model with the received electrical system data to compute a probability of failure of the transformer; and update a failure probability for the transformer based on the computed probability of failure.

11. The non-transitory computer-readable medium of claim 10, wherein the predetermined number is less than 200 and greater than 100, and the second predetermined number is greater than 200.

12. The non-transitory computer-readable medium of claim 11, wherein the selected first model is a first decision tree model, the selected second model is a backward regression model, and the selected third model is a second decision tree model.

13. The non-transitory computer-readable medium of claim 10, wherein the predetermined number is less than 200 and greater than 100, and the second predetermined number is less than 100.

14. The non-transitory computer-readable medium of claim 13, wherein the selected first model is a first decision tree model, the selected second model is a backward regression model, and the selected third model is a forward regression model.

15. The non-transitory computer-readable medium of claim 10, wherein, before receiving electrical system data, the computer-readable instructions further cause the computing device to:

select third highest worth variables from the plurality of variables based on the computed worth values, wherein a number of variables of the third highest worth variables is limited to a third predetermined number based on the received analysis type indicator;

select a fourth model based on the received analysis type indicator;

train the selected fourth model using values from the training dataset of the selected third highest worth variables to predict the probability of failure of the plurality of electrical transformers;

validate the trained fourth model using the validation dataset to statistically assess the fit by the trained fourth model to the historical electrical system data; and compare, after updating the probability of failure model selection, the fit by the trained fourth model to the fit by the selected probability of failure model; and update the probability of failure model selection as the validated fourth model or the updated probability of failure model based on the comparison between the trained fourth model and the selected probability of failure model.

16. The non-transitory computer-readable medium of claim 15, wherein the predetermined number is less than 200 and greater than 100, the second predetermined number is greater than or equal to 200, and the third predetermined number is less than 100.

17. The non-transitory computer-readable medium of claim 15, wherein the selected first model is a first decision tree model, the selected second model is a backward regression model, the selected third model is a second decision tree model, and the selected fourth model is a forward regression model.

18. The non-transitory computer-readable medium of claim 15, wherein the selected highest worth variables include meter event information, meter interval usage data, and transformer attribute information.

19. The non-transitory computer-readable medium of claim 18, wherein the selected second highest worth variables further include customer information, location information, weather information, meter attribute information, and meter maintenance information.

20. The non-transitory computer-readable medium of claim 19, wherein the selected third highest worth variables include only the weather information and the meter interval usage data.

21. A non-transitory computer-readable medium having stored thereon computer-readable instructions that when executed by a computing device cause the computing device to:

receive historical electrical system data that includes a plurality of observations with a plurality of data points defined for each observation, wherein each data point of the plurality of data points is associated with a variable to define a plurality of variables;

supplement the received historical electrical system data with values computed from one or more of the plurality of data points defined for each observation, wherein the values computed from one or more of the plurality of data points are counts associated with a plurality of electric meters that are summed over a predefined time interval, wherein the counts are further summed for the transformer to which the plurality of electric meters is connected;

partition the supplemented historical electrical system data into a training dataset and a validation dataset, wherein the validation dataset is different from the training dataset;

receive an analysis type indicator defined by a user;

compute a worth value for each of the plurality of variables;

select highest worth variables from the plurality of variables based on the computed worth values, wherein a number of variables of the highest worth variables is limited to a predetermined number based on the received analysis type indicator;

select a first model based on the received analysis type indicator;

train the selected first model using values from the training dataset of the selected highest worth variables to predict a probability of failure of a plurality of electrical transformers;

validate the trained first model using the validation dataset to statistically assess a fit by the trained first model to the historical electrical system data;

select a second model based on the received analysis type indicator;

train the selected second model using values from the training dataset of the selected highest worth variables to predict the probability of failure of the plurality of electrical transformers;

validate the trained second model using the validation dataset to statistically assess the fit by the trained second model to the historical electrical system data;

compare the fit by the trained first model to the fit by the trained second model;

select a probability of failure model as the validated first model or the validated second model based on the comparison;

receive electrical system data for a transformer;

execute the selected probability of failure model with the received electrical system data to compute a probability of failure of the transformer; and update a failure probability for the transformer based on the computed probability of failure.

22. The non-transitory computer-readable medium of claim 21, wherein the plurality of data points are associated with at least one of a phase error event, a time change event, a power outage event, a reverse rotation event, a tamper event, an unknown event, and an out of range event.

23. The non-transitory computer-readable medium of claim 21, wherein the counts are summed over a plurality of predefined time intervals, wherein the plurality of predefined time intervals include a last month, a last three months, and a last six months.

24. A computing device comprising:

a processor; and a non-transitory computer-readable medium operably coupled to the processor, the computer-readable medium having computer-readable instructions stored thereon that, when executed by the processor, cause the computing device to receive historical electrical system data that includes a plurality of observations with a plurality of data points defined for each observation, wherein each data point of the plurality of data points is associated with a variable to define a plurality of variables;

partition the received historical electrical system data into a training dataset and a validation dataset, wherein the validation dataset is different from the training dataset;

receive an analysis type indicator defined by a user;
compute a worth value for each of the plurality of variables;
select highest worth variables from the plurality of variables based on the computed worth values, wherein a number of variables of the highest worth variables is limited to a predetermined number based on the received analysis type indicator;
select a first model based on the received analysis type indicator;
train the selected first model using values from the training dataset of the selected highest worth variables to predict a probability of failure of a plurality of electrical transformers;
validate the trained first model using the validation dataset to statistically assess a fit by the trained first model to the historical electrical system data;
select a second model based on the received analysis type indicator, wherein the selected first model is a decision tree model and the selected second model is a stepwise regression model;
train the selected second model using values from the training dataset of the selected highest worth variables to predict the probability of failure of the plurality of electrical transformers;
validate the trained second model using the validation dataset to statistically assess the fit by the trained second model to the historical electrical system data;
compare the fit by the trained first model to the fit by the trained second model;
select a probability of failure model as the validated first model or the validated second model based on the comparison;
receive electrical system data for a transformer;
execute the selected probability of failure model with the received electrical system data to compute a probability of failure of the transformer; and
update a failure probability for the transformer based on the computed probability of failure.

25. The computing device of claim 24, wherein the predetermined number is less than 200 and greater than 100.

26. The computing device of claim 24, wherein, before receiving electrical system data, the computer-readable instructions further cause the computing device to:
select second highest worth variables from the plurality of variables based on the computed worth values, wherein a number of variables of the second highest worth variables is limited to a second predetermined number based on the received analysis type indicator;
select a third model based on the received analysis type indicator;
train the selected third model using values from the training dataset of the selected second highest worth variables to predict the probability of failure of the plurality of electrical transformers;
validate the trained third model using the validation dataset to statistically assess the fit by the trained third model to the historical electrical system data; and
compare, after selecting the probability of failure model, the fit by the trained third model to the fit by the selected probability of failure model; and
update the probability of failure model selection as the validated third model or the selected probability of failure model based on the comparison between the trained third model and the selected probability of failure model.

27. A method of predicting a probability of a transformer failure, the method comprising:
receiving historical electrical system data that includes a plurality of observations with a plurality of data points defined for each observation, wherein each data point of the plurality of data points is associated with a variable to define a plurality of variables;
partitioning, by a computing device, the received historical electrical system data into a training dataset and a validation dataset, wherein the validation dataset is different from the training dataset;
receiving an analysis type indicator defined by a user;
computing, by the computing device, a worth value for each of the plurality of variables;
selecting, by the computing device, highest worth variables from the plurality of variables based on the computed worth values, wherein a number of variables of the highest worth variables is limited to a predetermined number based on the received analysis type indicator;
selecting, by the computing device, a first model based on the received analysis type indicator;
training, by the computing device, the selected first model using values from the training dataset of the selected highest worth variables to predict a probability of failure of a plurality of electrical transformers;
validating, by the computing device, the trained first model using the validation dataset to statistically assess a fit by the trained first model to the historical electrical system data;
selecting, by the computing device, a second model based on the received analysis type indicator, wherein the selected first model is a decision tree model and the selected second model is a stepwise regression model;
training, by the computing device, the selected second model using values from the training dataset of the selected highest worth variables to predict the probability of failure of the plurality of electrical transformers;
validating, by the computing device, the trained second model using the validation dataset to statistically assess the fit by the trained second model to the historical electrical system data;
comparing, by the computing device, the fit by the trained first model to the fit by the trained second model;
selecting, by the computing device, a probability of failure model as the validated first model or the validated second model based on the comparison;
receiving electrical system data for a transformer;
executing, by the computing device, the selected probability of failure model with the received electrical system data to compute a probability of failure of the transformer; and
updating, by the computing device, a failure probability for the transformer based on the computed probability of failure.

28. The method of claim 27, wherein the predetermined number is less than 200 and greater than 100.

29. The method of claim 27, further comprising:
selecting second highest worth variables from the plurality of variables based on the computed worth values, wherein a number of variables of the second highest worth variables is limited to a second predetermined number based on the received analysis type indicator;
selecting a third model based on the received analysis type indicator;

training the selected third model using values from the training dataset of the selected second highest worth variables to predict the probability of failure of the plurality of electrical transformers;

validating the trained third model using the validation dataset to statistically assess the fit by the trained third model to the historical electrical system data; and comparing, after selecting the probability of failure model, the fit by the trained third model to the fit by the selected probability of failure model; and updating the probability of failure model selection as the validated third model or the selected probability of failure model based on the comparison between the trained third model and the selected probability of failure model.

30. The method of claim 29, wherein before receiving electrical system data the method further comprises:

selecting third highest worth variables from the plurality of variables based on the computed worth values, wherein a number of variables of the third highest worth variables is limited to a third predetermined number based on the received analysis type indicator;

selecting a fourth model based on the received analysis type indicator;

training the selected fourth model using values from the training dataset of the selected third highest worth variables to predict the probability of failure of the plurality of electrical transformers;

validating the trained fourth model using the validation dataset to statistically assess the fit by the trained fourth model to the historical electrical system data; and comparing, after updating the probability of failure model selection, the fit by the trained fourth model to the fit by the selected probability of failure model; and updating the probability of failure model selection as the validated fourth model or the updated probability of failure model based on the comparison between the trained fourth model and the selected probability of failure model.

* * * * *